(12) United States Patent
Buerger

(10) Patent No.: US 10,517,314 B2
(45) Date of Patent: Dec. 31, 2019

(54) COLD-BREW COFFEE BREWING SYSTEM AND COLD-BREWING METHOD

(71) Applicant: GUNGA, LLC, Centennial, CO (US)

(72) Inventor: Raymond K. Buerger, Centennial, CO (US)

(73) Assignee: Gunga, LLC, Centennial, CO (US)

( * ) Notice: Subject to any disclaimer, the term of this patent is extended or adjusted under 35 U.S.C. 154(b) by 0 days.

(21) Appl. No.: 16/071,141

(22) PCT Filed: Mar. 28, 2018

(86) PCT No.: PCT/US2018/024923
§ 371 (c)(1),
(2) Date: Jul. 19, 2018

(87) PCT Pub. No.: WO2018/187123
PCT Pub. Date: Oct. 11, 2018

(65) Prior Publication Data
US 2019/0261643 A1    Aug. 29, 2019

Related U.S. Application Data

(60) Provisional application No. 62/480,638, filed on Apr. 3, 2017.

(51) Int. Cl.
*A23F 5/26* (2006.01)
*A47J 31/06* (2006.01)
*A47J 31/44* (2006.01)
(52) U.S. Cl.
CPC ............. *A23F 5/26* (2013.01); *A47J 31/0657* (2013.01); *A47J 31/4403* (2013.01)

(58) Field of Classification Search
CPC ...... A23F 5/26; A47J 31/0657; A47J 31/4403
See application file for complete search history.

(56) References Cited

U.S. PATENT DOCUMENTS

| 1,193,334 | A | | 8/1916 | Acheson | |
|---|---|---|---|---|---|
| 2,331,705 | A | * | 10/1943 | Lehmann | A47J 31/043 99/292 |
| 2,878,746 | A | | 3/1959 | Schwinger | |
| 3,641,918 | A | | 2/1972 | Schellgell | |
| 4,112,830 | A | | 9/1978 | Saito | |
| 4,231,876 | A | * | 11/1980 | Zimmermann | A47J 31/06 210/232 |

(Continued)

FOREIGN PATENT DOCUMENTS

| KR | 20160133710 | 11/2016 |
|---|---|---|
| KR | 101711850 | 3/2017 |
| WO | 2016191360 | 12/2016 |

*Primary Examiner* — Anthony J Weier
(74) *Attorney, Agent, or Firm* — Marsh Fischmann & Breyfogle LLP

(57) ABSTRACT

A cold-brew coffee brewing system has a brew tank assembly supported in an elevated position by a tank support structure. A fluid-permeable support structure is removable from below the interior volume of a tank body for accessing the interior volume to remove used coffee grounds. A swing arm assembly supported by the tank support structure facilitates convenient support and movement of the fluid permeable support structure under a load of used coffee grounds in the interior volume of the tank body. A cold-brewing method for preparing cold-brew coffee may use the cold-brew coffee brewing system.

21 Claims, 17 Drawing Sheets

(56) References Cited

U.S. PATENT DOCUMENTS

| | | |
|---|---|---|
| 6,399,136 B1 | 6/2002 | Watkins, Jr. |
| 6,405,637 B1 | 6/2002 | Cai |
| 8,387,516 B1 | 3/2013 | Reynolds |
| 2004/0094039 A1* | 5/2004 | Brizio .................. A47J 31/303 99/279 |
| 2004/0226452 A1 | 11/2004 | Lyall, III |
| 2006/0016345 A1 | 1/2006 | Paloheimo |
| 2013/0295244 A1 | 11/2013 | Reyhanloo |
| 2014/0072690 A1 | 3/2014 | Ha |
| 2014/0076168 A1 | 3/2014 | Lin |
| 2016/0007796 A1 | 1/2016 | De Graaff et al. |
| 2016/0338522 A1 | 11/2016 | Van Schyndel et al. |
| 2017/0086473 A1 | 3/2017 | Ingold |

* cited by examiner

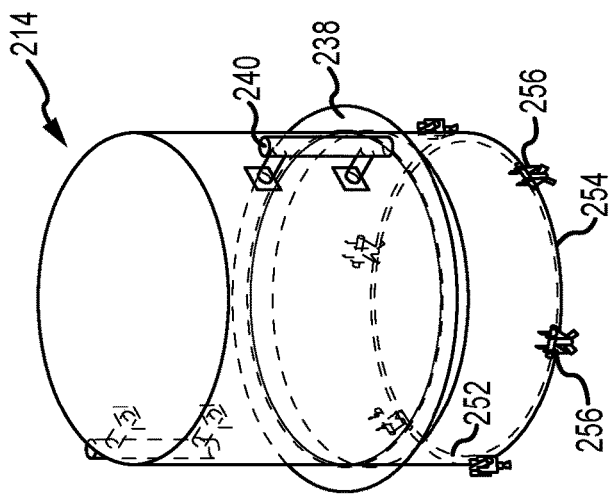
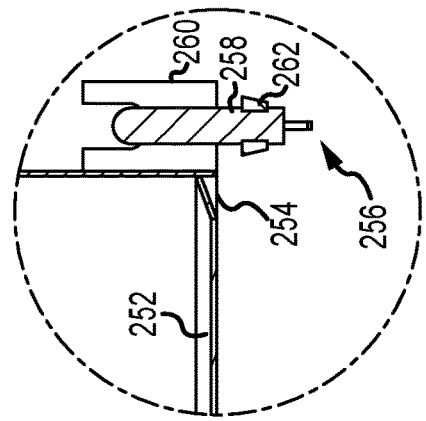
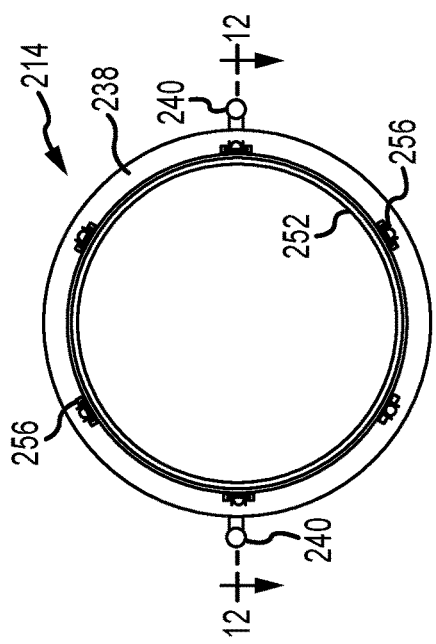
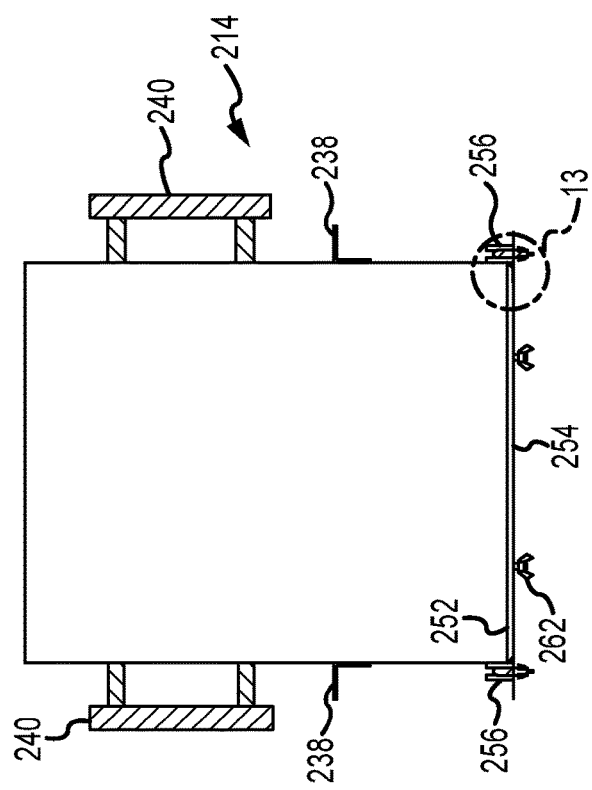
FIG. 10
FIG. 13
FIG. 11
FIG. 12

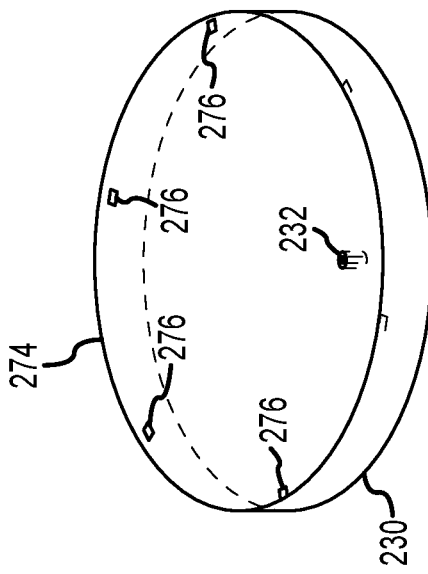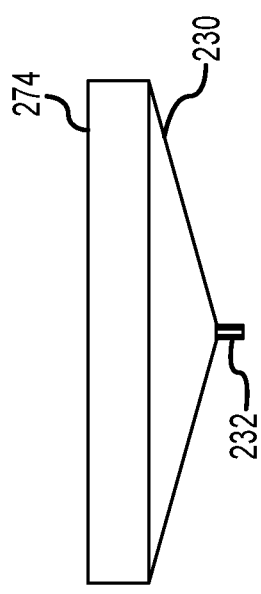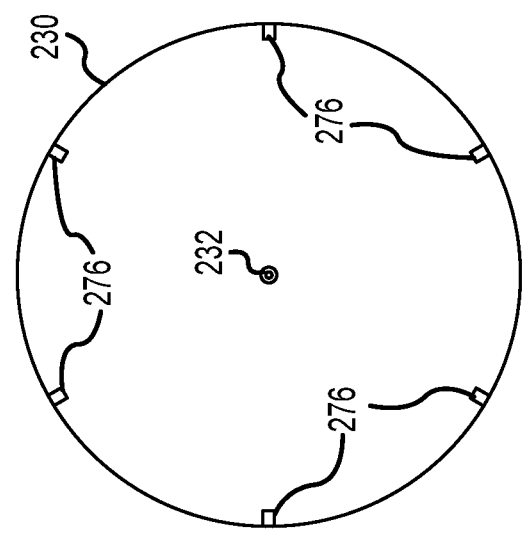

COLD-BREW COFFEE BREWING SYSTEM AND COLD-BREWING METHOD

REFERENCE TO RELATED APPLICATION

This application claims the benefit of U.S. provisional patent application Ser. No. 62/480,538 entitled "COLD-BREW COFFEE BREWING SYSTEM AND COLD-BREWING METHOD" filed Apr. 3, 2017, the entire contents of which, and each and every portion of which, are incorporated herein by reference for all purposes.

BACKGROUND

Cold-brew coffee is coffee brewed using cooler water to extract flavors from coffee grounds, compared to hot water extraction methods in which the coffee flavors are with extracted very hot water that may be near or even above the boiling temperature of the water. Such hot water-extracted coffee includes, for example coffee prepared by steeping with hot water in a French press, percolated coffee, hot-drip coffee and espresso. Cold-brew coffee is often made from water either at ambient room temperature or water that has been chilled, for example by adding ice to the water or refrigerating the water prior to the brewing operation. Because of the lower water temperature, there may be a significantly different mixture of components extracted from the coffee grounds during the brewing process than for hot water extraction brewing methods, and as a result cold-brew coffee may have a significantly different flavor and feel.

Hot brewing cycles for preparing hot water-extracted coffee tend to be relatively short, on the order of several minutes for hot-drip coffee and even shorter for espresso. As a result in commercial coffee establishments such as coffee shops and restaurants, hot water-extracted coffee is normally made as needed during the business day largely in response to customer demand. In contrast, cold-brewing cycles tend to be quite long, often on the order of 8 hours or more, and require significantly more planning and lead-time for such a commercial coffee establishment.

One type of brewing technique for cold-brewing coffee involves steeping the coffee grounds in a bath of the cool water for many hours, followed by separation of the cold-brew coffee from the used coffee grounds using a screen or filter. Such a cold-steeping technique may be performed for example in a French press-type system or in a so-called "Toddy" system. Another type of brewing technique for cold-brewing coffee involves dripping the cool water over a bed of coffee grounds for several hours and collecting the cold-brew coffee exiting the coffee grounds over that long brewing cycle. Such a slow-drip technique is sometimes referred to as a Kyoto-style brewing technique. Both of these types of techniques may be used to prepare high-quality cold-brew coffee, although the brewing systems in both cases tend to be of limited size designed to brew only small quantities of cold-brew coffee. Commercial establishments therefore may need to operate several of these brewing systems to produce larger quantities of cold-brew coffee. With respect to the cold-steep brewing technique, the cold-steep brewing systems tend to be relatively convenient to use and relatively easy to clean in preparation for the next cold-brewing cycle. However one problem with such cold-steep brewing systems is that a significant amount of the coffee brewing potential of the coffee grounds may be effectively lost due to residual cold-brew coffee that remains with the used coffee grounds. With respect to cold-drip brewing methods, the cold-drip brewing systems tend to be cumbersome and not easy to use and not easy to clean in preparation for the next brewing cycle.

SUMMARY

Disclosed herein is a versatile cold-brew coffee brewing system and method of cold-brewing coffee performable using the cold-brew coffee brewing system. The brewing system may advantageously permit making cold-brew coffee batches of varying size in commercial quantities and with easy operation and convenient handling of used coffee grounds and cleaning of equipment between cold-brewing cycles.

In one aspect of this disclosure, a cold-brew coffee brewing system is provided that may include;
   a brew tank assembly, comprising:
      a tank body with an interior volume including a bed volume to contain a bed of the coffee grounds during cold-brewing cycles to brew cold-brew coffee;
      a top cover disposed to enclose the bed volume from above during a said cold-brewing cycle and being selectively removable to access the interior volume to load coffee grounds in the bed volume for a said cold-brewing cycle; and
      a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
   a feed water distribution system in fluid communication with the interior volume and configured to distribute a dispersion of feed water over a top surface area of the bed of the coffee grounds disposed in the bed volume during a said cold-brewing cycle; and
   a tank support structure supporting the tank body in an elevated position during a said cold-brewing cycle;
wherein:
   the top cover is selectively removable to access the interior volume from above through an open top end of the tank body to load fresh said coffee grounds into the bed volume for a said cold-brewing cycle;
   the fluid-permeable support structure is selectively removable from below the bed volume with the tank body supported in the elevated position by the tank support structure for removal of used said coffee grounds from the interior volume through an open bottom end of the tank body following a said cold-brewing cycle; and
   in the elevated position the tank body has a vertical clearance below the open bottom end of the tank body to receive a waste container below the interior volume to receive the used said coffee grounds removed from the interior volume through the open bottom end of the tank body.

In another aspect of this disclosure a method of cold-brewing coffee is provided that may include:
   loading the coffee grounds into an interior volume of a tank body of a brew tank assembly, wherein the brew tank assembly comprises:
      a tank body with the interior volume including a bed volume to contain coffee grounds in a bed of the coffee grounds during cold-brewing cycles to brew cold-brew coffee;
      a top cover to enclose the interior volume from above during a said cold-brewing cycle and being selectively removable to access the interior volume; and a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;

wherein as loaded into the interior volume during the loading, the coffee grounds are in a bed of the coffee grounds contained in the bed volume;

after the loading, introducing feed water into the interior volume above the coffee grounds through a feed water distribution system in fluid communication with the interior volume and configured to distribute a dispersion of feed water over a top surface area of the bed of the coffee grounds disposed in bed volume;

performing the introducing feed water until a total quantity of feed water has been introduced into the interior volume for a complete said cold-brewing cycle;

permitting water from the feed water to percolate through the coffee grounds; and collecting the cold-brew coffee passing through the permeable support structure and exiting the tank assembly;

after the collecting the cold-brew coffee, removing the fluid-permeable support structure from below the bed volume and removing the coffee grounds from the interior volume of the tank body through an open bottom end of the tank body;

wherein during the loading coffee grounds, the introducing feed water, the collecting the cold-brew coffee and the removing the coffee grounds, the tank body is supported by a tank support structure in an elevated position with a vertical clearance below the tank body to accommodate access to below the tank body to remove the fluid-permeable support structure from below the bed volume and to remove the coffee grounds from the interior volume through the open bottom end of the tank body. The method may be performed using the cold-brew coffee brewing system of the first-mentioned aspect.

A number of feature refinements and additional features may be applicable to these and other aspects of the disclosure, as may be illustrated in the drawings and/or described in the embodiment descriptions provide below.

BRIEF DESCRIPTION OF THE DRAWINGS

FIGS. 8-29 illustrate another embodiment of a cold-brew coffee brewing system and various features thereof.

DETAILED DESCRIPTION

Figure 1:
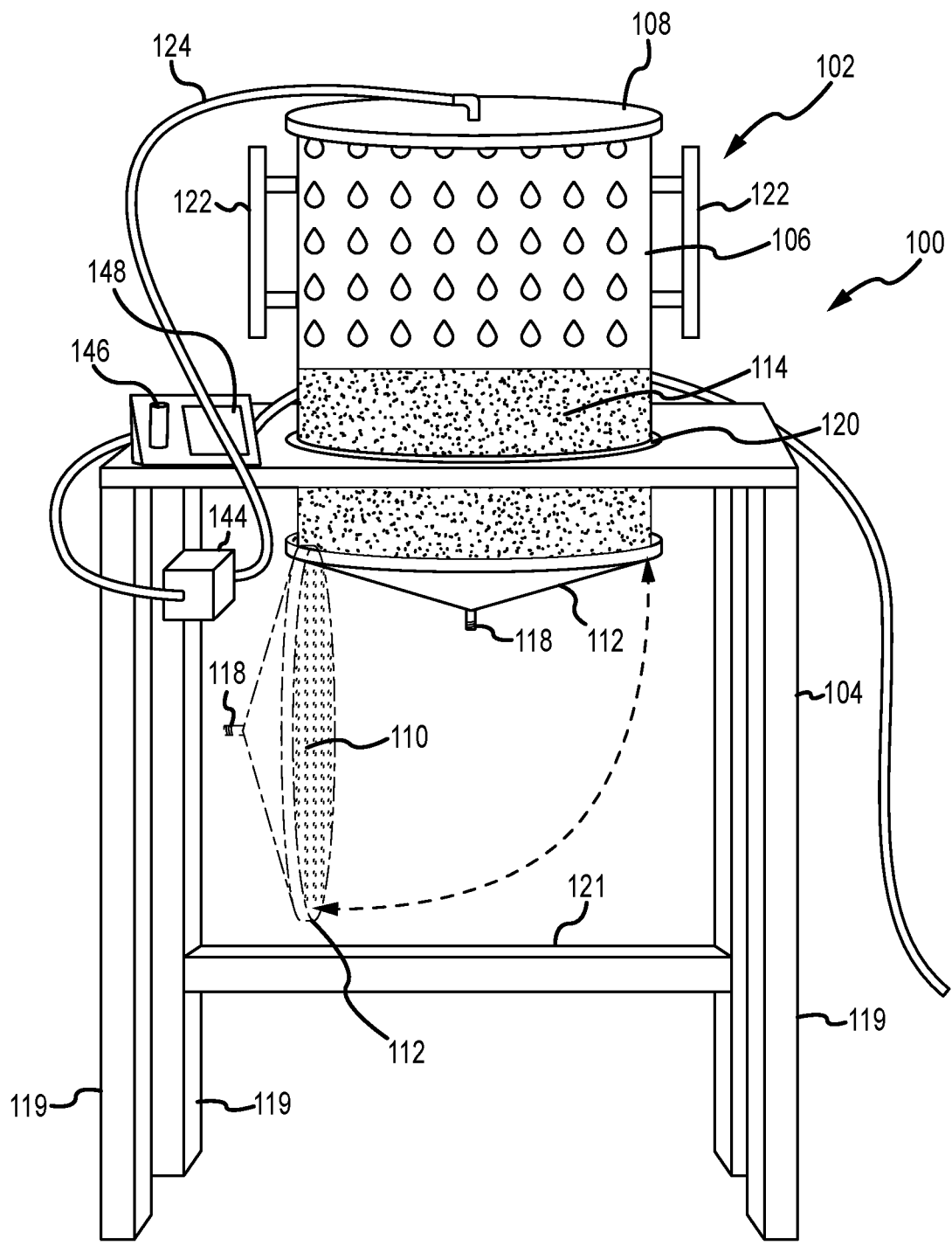
FIG. 1 illustrates an embodiment of a cold-brew coffee brewing system.

Reference is made to FIGS. 1-4 illustrating an example embodiment of a cold-brew coffee brewing system. As shown in FIG. 1, a cold-brew coffee brewing system 100 includes a brew tank assembly 102 supported in an elevated position by a tank support structure 104. The brew tank assembly 102 includes a tank body 106 with an interior volume in which coffee grounds may be disposed for a cold-brewing cycle, a top cover 108 enclosing the interior volume from above, a fluid-permeable support structure 110 and a collection funnel 112, in which the fluid-permeable support structure is retained. In the illustration of FIG. 1, the collection funnel 112 is configured to be movable between a closed position in which the collection funnel 112 encloses the interior volume of the tank body 106 from below and an opened position in which the collection funnel 112 may be swung open to open the bottom end of the tank body 106 to permit used coffee grounds to be removed from the interior volume of the tank body 106 through the open bottom end. For illustration purposes, the brew tank assembly 102 is shown having a bed of coffee grounds 114 disposed in a bed volume within the interior volume of the tank body 106 and showing a dispersion of water in the form of droplets raining down onto the bed of coffee grounds 114, such as would be the case during a cold-brewing cycle to prepare cold-brew coffee. Cold-brew coffee would exit the brew tank assembly 102 during such a cold-brewing cycle through a fluid outlet 118 at the bottom of the collection funnel 112. When the collection funnel 112 is in the closed position, the fluid-permeable support structure supports the bed of coffee grounds 114 in the interior volume of the tank body 106. Also as shown in FIG. 1, when the collection funnel 112 is moved from the closed position to the opened position, the fluid-permeable support structure 110 moves with the collection funnel 112 and is removed from below the interior volume of the tank body 106, removing support from below the bed of coffee grounds 114 to permit the coffee grounds to fall out of the open bottom end of the tank body 106. Such falling coffee grounds may be collected in a waste receptacle (not shown) that may be received in the tank support structure 104 below the tank body 106. Such a waste receptacle may be positioned below the tank body 106 prior to swinging open the collection funnel 112 and the collection funnel 112 may be swung into the waste receptacle and falling coffee grounds may be conveniently collected in the waste receptacle. The collection funnel 112 may be configured to be removed entirely from the tank body 106 and may be removed from such a waste receptacle and cleaned separately prior to use in another cold-brewing cycle. In the configuration illustrated in FIG. 1, the tank support structure 104 includes support legs 119 with stabilizing cross-members 121 between pairs of legs except for one of the pairs of the support legs 119 between which there is no cross-member. The tank support structure 104 therefore includes an opening on the side without a cross-member to accommodate translating such a waste receptacle through that side opening to be received within the support structure positioned below the brew tank assembly 102 and the interior volume in the tank body 106 to receive the used coffee grounds when the collection funnel 112 is swung to the open position following a cold-brewing cycle.

With continued reference to FIG. 1, the tank assembly 102 is supported by the tank support structure 104 through a support ring 120 attached around the outer circumference of the tank body 106. The tank body 106 may be inserted from above into an opening through the top of the tank support structure 104 until the support ring 120 engages a platform surface of tank support structure 104 to support the tank body 106. The brew tank assembly 102 includes handles 122 attached to opposite sides of the tank body 106, for convenient use to lift and lower the tank body 106 from or into the opening in the tank support structure 104 to insert the tank body 106 into the opening to be supported by the tank support structure 104 or to remove the tank body 106 from being supported by the tank structure 104. For example, the tank body 106 may be removed from the tank support structure 104 following a cold-brewing cycle so that the tank body 106 may be cleaned at a remote location prior to reuse for another cold-brewing cycle. Alternatively, the tank body may be cleaned in place as support by the tank support structure 104.

Figure 2:
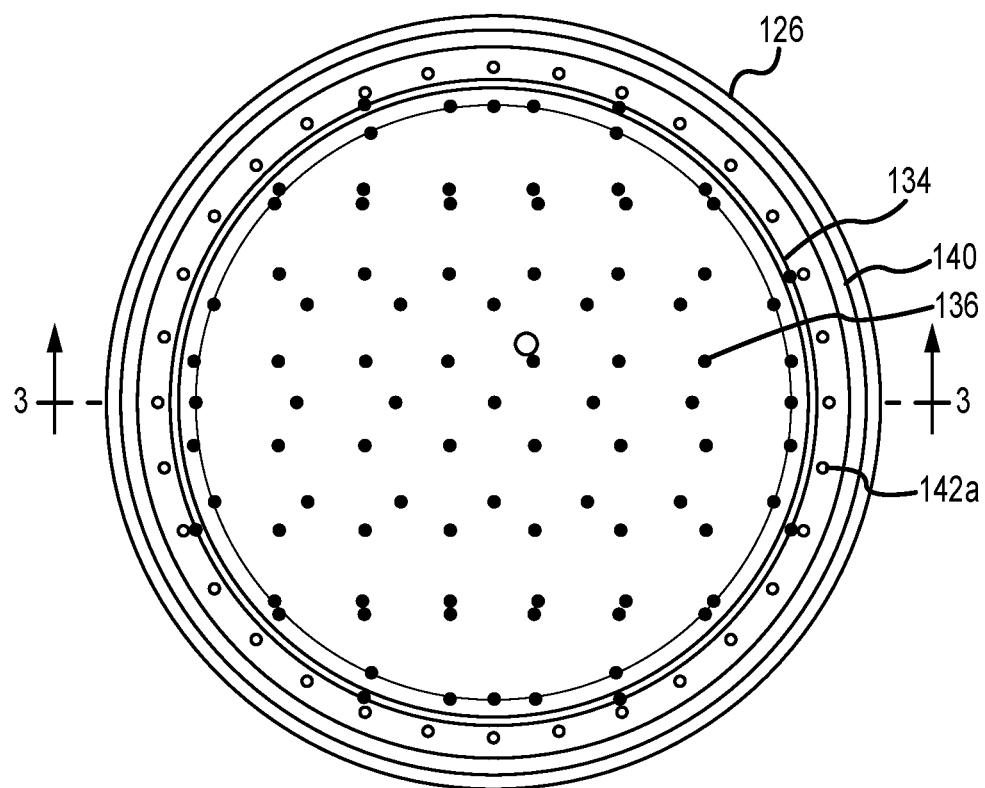
FIGS. 2-4 illustrate an implementation for a top cover including feed water distribution features.
Figure 3:
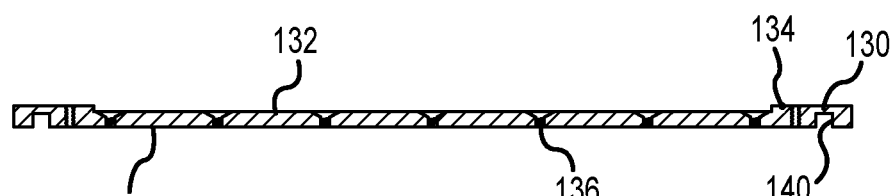
Figure 4:
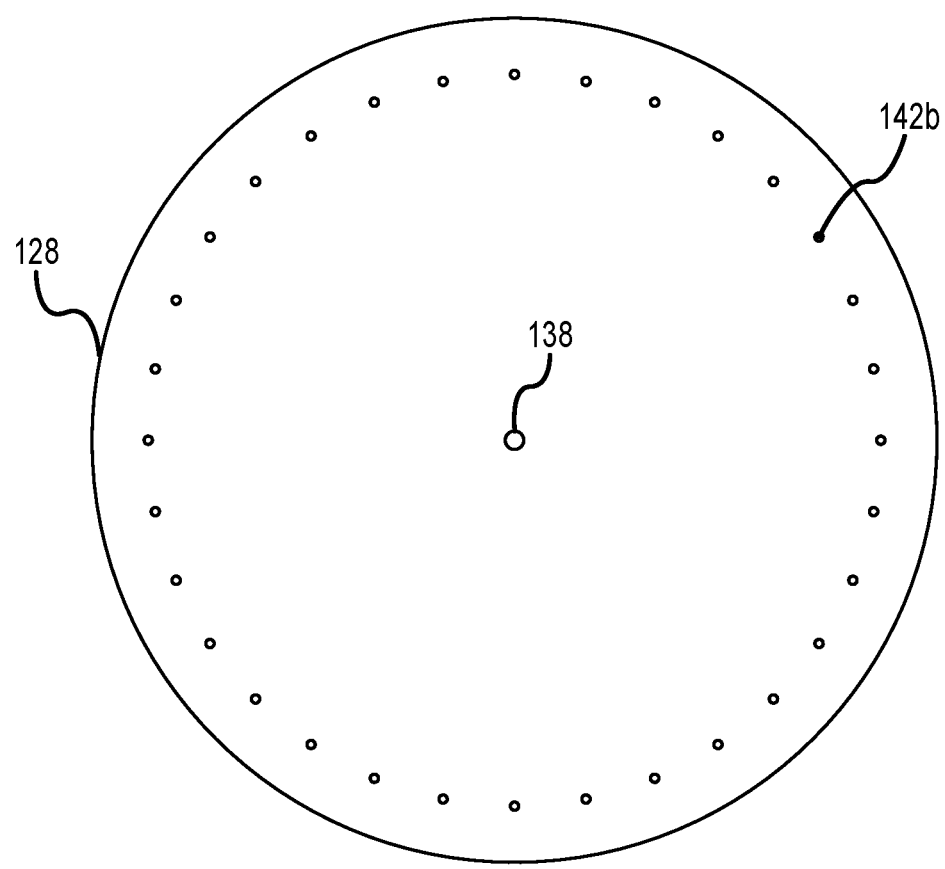

With reference now to FIG. 1 together with FIGS. 2-4, the cold-brew coffee system 100 includes a feed water distribution system to provide a dispersion of feed water in the form of the droplets into the interior volume of the tank body 106 during a cold-brewing cycle. The water distribution system includes a water feed line 124 through which feed water is delivered to a fluid manifold cavity in the top cover 108. The water feed line 124 may be connected with a water source, such as a municipal water system, fresh water well, water storage tank or other source of water. The feed water for the cold-brew coffee will typically be significantly lower than boiling or near-boiling water used for hot-brew coffee. The feed water temperature for the cold-brew coffee may for example be at a temperature in a range of from 3° C. to 80° C., preferably from 3° C. to 40° C. The temperature of the feed water may often be at ambient temperature (e.g., room temperature), or may be at a reduced temperature to ambient temperature (e.g., chilled temperature).

Details of the top cover 108 and water distribution features of the top cover 108 are shown in FIGS. 2-4. FIGS. 2 and 3 show a top view and sectional view, respectively of a bottom piece 126 of the top cover 108 and FIG. 4 shows a top piece 128 of the top cover 108. In the assembly of the top cover 108, the top piece 128 is attached to and covers a top side 130 of the bottom piece 126. The bottom piece 126 has a central recess area 132 that forms a fluid manifold cavity in the top cover 108 between the top piece 128 and the bottom piece 126. A fluid seal is provided around the perimeter of the fluid manifold cavity by an O-ring 134 disposed around the periphery of the recess area 132. The bottom piece 126 contains a grid of drip orifice holes 136 through which feed water is permitted to drip from the fluid manifold cavity of the top cover 108 as a dispersion of feed water in the interior volume of the tank body 106 over a top surface of the bed of coffee grounds 114 during a cold-brewing cycle. Drip inserts of any desired size may be inserted into the drip orifice holes to provide a drip orifice of any desired size and may be changed as desired to change the water distribution characteristics of feed water passing from the fluid manifold cavity in top cover 108 as a dispersion into the interior volume of the tank body 106. As shown in FIG. 4, the top piece 128 includes a centrally-located feed port 138 through which a feed connection may be provided with the water feed line 124 to provide feed water into the fluid manifold cavity in the top cover 108. As seen in FIGS. 2 and 3, the top piece 126 includes a channel recess 140 around an outer perimeter portion of the top piece 126 on a bottom side of the top piece 126. The channel recess 140 is configured to interface with and receive a top edge portion of the wall of the tank body 106 for secure placement of the top cover 108 on the tank body 106. The bottom cover 126 and a top cover 128 may be attached through corresponding attachment holes 142a,b, for example with screws, bolts, rivets or other attachment mechanisms.

With continued reference to FIG. 1, the coffee brewing system 100 includes a brew control system including a flow sensor unit 144, a flow control valve 146, and a controller unit 148 including a user interface. The brew control system may be operable to control performance of a cold-brewing cycle. Through the user interface brewing instructions may be specified for a cold-brewing cycle, which instructions are executable by an electronic controller in the controller unit 148. The controller unit 148 is in communication with the flow sensor unit 144 and the flow control valve 146 and may monitor water feed rate based on sensor signals from the flow sensor unit 144 and may analyze water feed information over time in relation to desired cold-brewing cycle performance and the controller unit may as needed generate control signals to the flow control valve 146 to manipulate the flow control valve to increase or decrease the water feed rate through the water feed line 124 to the brew tank assembly 102. The controller unit 148 may include a display screen, which may include touch-screen capabilities to provide for user interface to both input brewing instructions and may provide a real-time video display of progress of a cold-brewing cycle. In an alternative configuration, the controller unit 148 may be connected with a separate computing device, such as a laptop, which may provide user interface for the brew control system. The controller unit 148, or a separate unit connected with the controller unit 148 (e.g., a laptop or other computing device), may include a data recorder (e.g., nonvolatile memory) to record performance information for the cold-brewing cycle.

Figure 5:
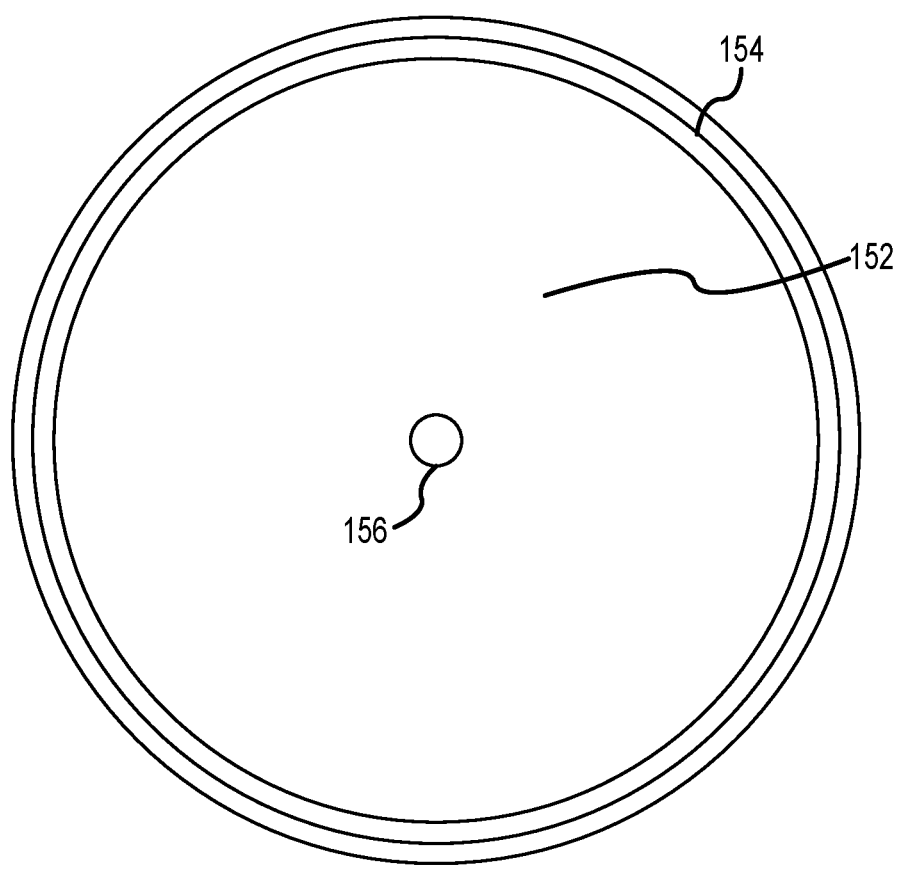
FIGS. 5 and 6 illustrate another implementation for a top cover and a feed water distribution system including a vertical adjustment feature.
Figure 6:
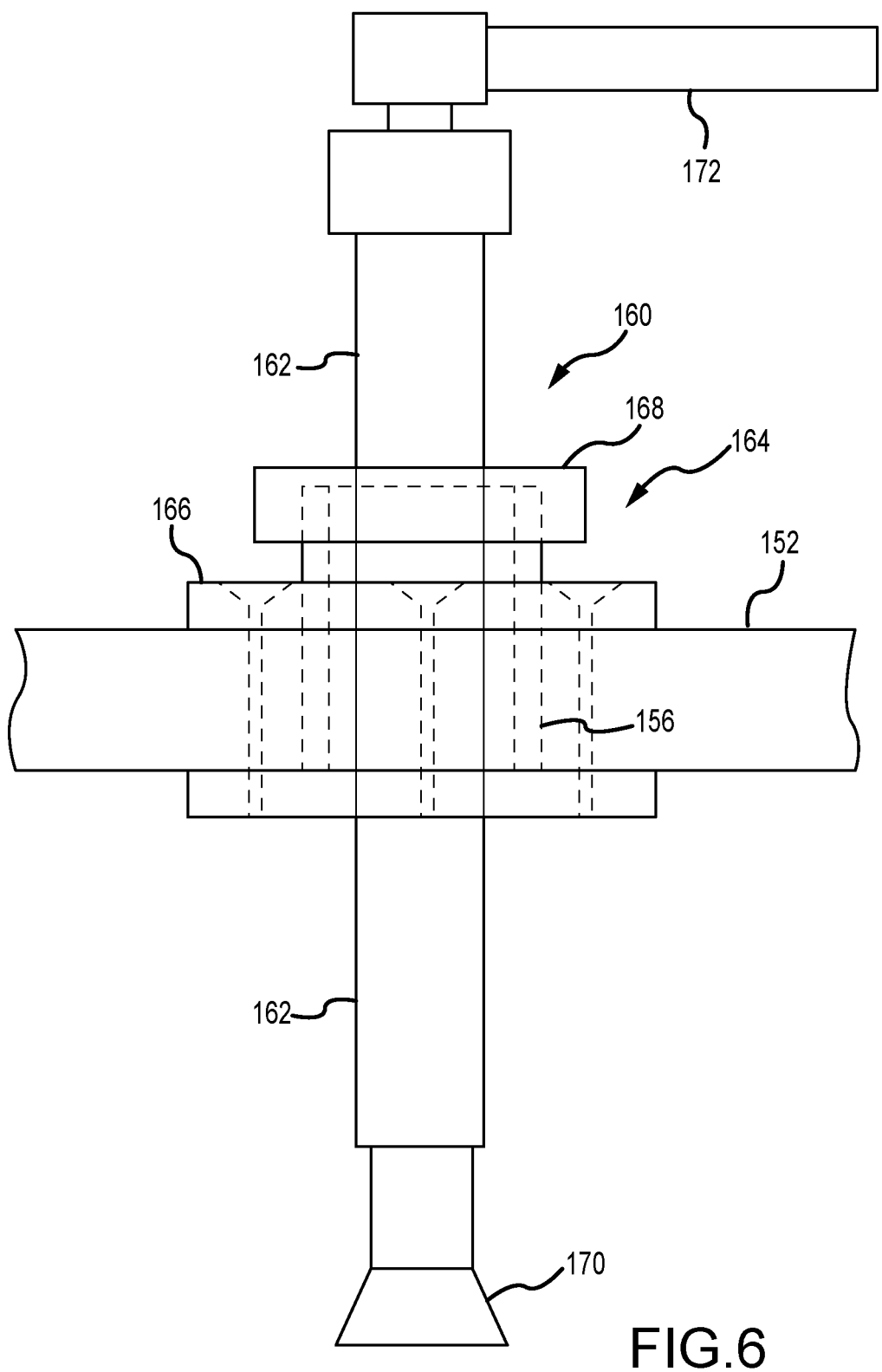

Reference is now made to FIGS. 5 and 6 together with FIG. 1 to describe an alternative configuration for a top cover and a feed water distribution system that may be used as an alternative to the top cover 108 and the fluid manifold cavity illustrated in FIGS. 3-4. The feed water distribution system illustrated in FIGS. 5 and 6 includes an alternative top cover design that accommodates a spray head disposed inside the interior to provide a dispersion of water over the top of the bed of coffee grounds during a cold-brewing cycle and with an elevation of the spray head being adjustable within the interior volume of the tank body 106 to provide a desired separation of the spray head from a top level of the bed of coffee grounds 114. FIG. 5 shows a bottom view of a top cover 152 made of a single piece of material (e.g., single plastic piece), and including a channel recess 154 for interfacing with and receiving a top edge portion of the wall of the tank body 106, similar to the channel recess 140 of the bottom piece 126 of the top cover 108 shown and described in relation to FIGS. 1-4. The top cover 152 includes a centrally-located port 156 which may provide access for supplying feed water into the interior volume of the tank body 106 on which the top cover 152 may be disposed. FIG. 6 shows a portion of the top cover 152 with a height-adjustable feed water distribution system 160 interfaced with the top cover 152. As shown in FIG. 6, the height-adjustable feed water distribution system 160 includes a vertically translatable conduit member 162 (e.g., length of pipe) passing through the port 156 of the top cover 152. The height-adjustable feed water distribution system 160 also includes a locking mechanism supported by the top cover 152 in the form of a collet assembly 164 including a collar 166 and a collet nut 168 disposed about the translatable conduit member 162. The collet nut 168 may be unthreaded from the collar 166 to unlock the translatable conduit member 162 so that the translatable conduit member 162 may be translated through the port 156 to raise or lower the translatable conduit member 162 and accordingly to raise or lower a spray head 170 connected to a lower end of the translatable conduit member 162. After setting the spray head 170 at the desired elevation, the collet nut 168 may be threaded into the caller 166 to clamp against the translatable conduit member 162 to lock the translatable conduit member 162 into place. As shown in FIG. 6, the translatable conduit member is connected on an inlet side with a water feed line 172 through which feed water may be introduced through the translatable conduit member 162 to the spray head 170, to produce a dispersion of feed water in the interior volume of the tank body 106 above a top surface of a bed of coffee grounds 114 for a cold-brewing cycle. The feed water distribution system may provide a vertical separation between a lowermost water outlet of the feed water distribution system (e.g., the bottom elevation of the spray head 170) and a top elevation of the bed of the coffee grounds in the interior volume in a range of from 10 centimeters to 30 centimeters and preferably from 15 centimeters to 25 centimeters. In some implementations, the feed water distribution system may advantageously provide for vertical adjustment of delivery of the dispersion of feed water into the interior volume, such through adjustment of the elevation of the spray head 170 shown, over an adjustable vertical distance of at least 10 centimeters, and preferably in a range of from 10 centimeters to 100 centimeters, and the translatable conduit member 162 may have a translatable length sufficient for such vertical adjustment over that vertical distance. In some contemplated implementations, a cold-brew coffee brewing system may include a number of different spray heads designed for effective operation at within different feed water delivery rates, and the appropriate spray heads may be changed out depending upon the rate at which feed water is to be delivered to the interior volume for a cold-brewing cycle. As may be appreciated, different spray heads may have different spray patterns (e.g., varying spay angles), and an optimal vertical separation between a top elevation of the coffee grounds and the spray head may vary for different spray heads.

Figure 7:
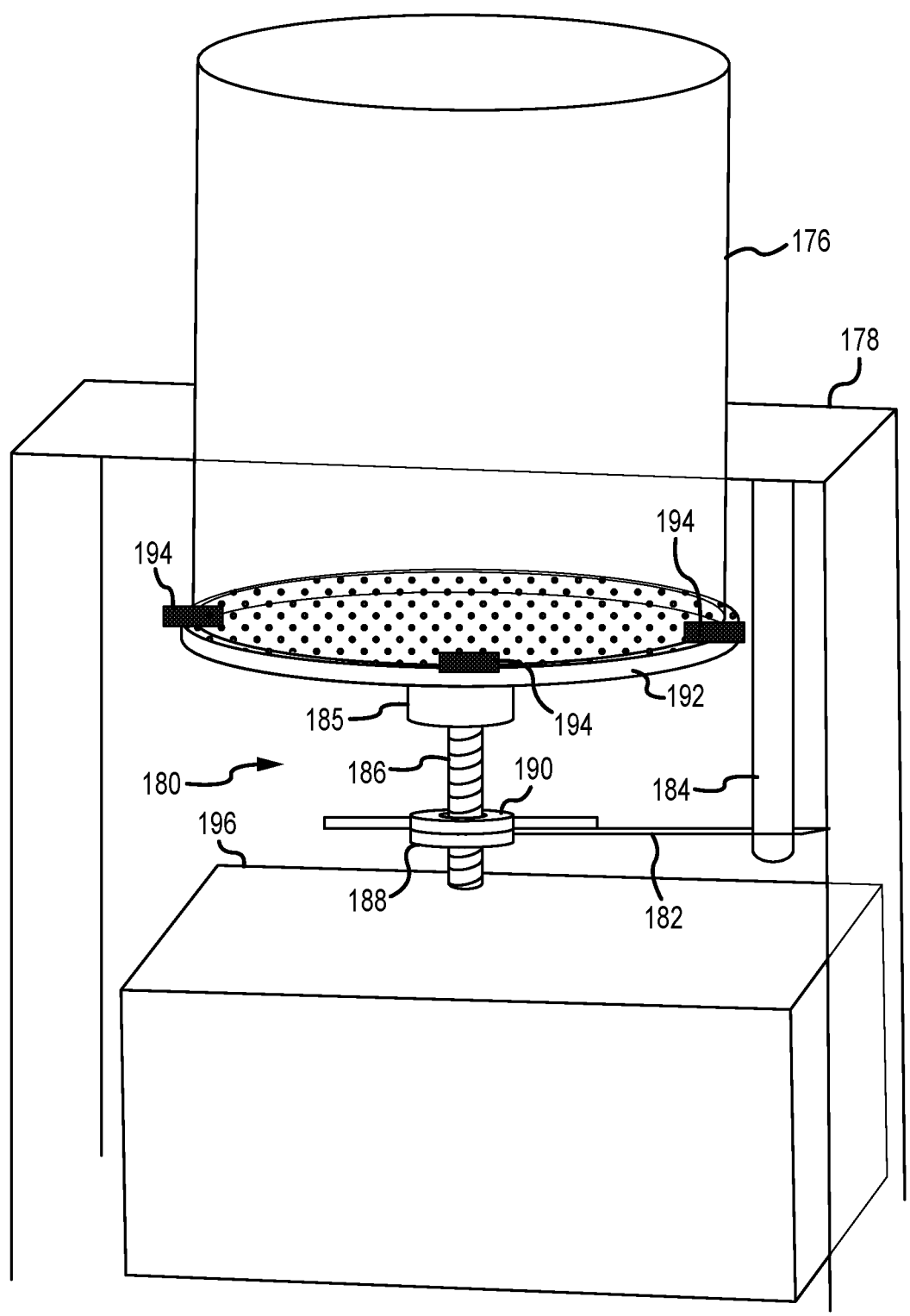
FIG. 7 illustrates an implementation of a swing arm assembly for use with a cold-brew coffee brewing system.

Reference is now made to FIG. 7, which illustrates an example of a swing arm assembly that may be included in a cold-brew coffee brewing system, for example the system 100 shown in FIG. 1. FIG. 7 very generally illustrates an example tank body 176 supported by a tank support structure 178. FIG. 7 shows an example swing arm assembly 180 that is connected to and supported by the tank support structure 178. The swing arm assembly 180 includes a movable support member 182 that pivots about a pivot member 184 to permit lateral articulating movement of the movable support member 182. In addition to pivotal movement about the pivot member 184, the movable support member 182 may also include one or more lateral articulation joints. The swing arm assembly 180 includes a load engagement member 185 and a vertical adjustment screw mechanism including a vertically-extending threaded member 186 that extends through an opening through a bearing member 188 attached to the movable support member 182. The threaded member 186 is threaded through a rotatable collar 190 including corresponding internal threads, and the rotatable collar 190 may be rotated relative to the bearing member 188 to raise and lower the threaded member to correspondingly raise and lower the load engagement member 185. In the illustration shown in FIG. 7, the load engagement member 185 has been raised to an elevation to engage a fluid-permeable support structure 192 for support of the fluid-permeable support structure 192 and a load of a bed of coffee grounds that may be disposed on top of the fluid-permeable support structure 192 in the interior volume of the tank body 176. In this illustrated embodiment, the fluid-permeable support structure 192 is secured to the tank body 176 in a brew tank assembly by securement mechanisms 194 (e.g., latches, screws, bolts, nuts, etc.) independent of a collection funnel as was the case in the embodiment illustrated in FIG. 1. In the embodiment illustrated in FIG. 7, such a collection funnel included in a brew tank assembly during a cold-brewing cycle may have already been removed from the brew tank assembly following completion of a cold-brewing cycle in anticipation of removing the fluid-permeable support structure 192 and the bed of used coffee grounds. The swing arm assembly 180 may be particularly beneficial for controlled removal of the fluid-permeable support member 192 from below the tank body 176 under load from the coffee grounds to permit convenient removal of the coffee grounds from the interior volume of the tank body 176.

With continued reference to FIG. 7, an example procedure will be described for removing a bed of used coffee grounds from the interior volume of the tank body 176 using the swing arm assembly 180. With the load engagement member 185 initially in a lowered position, the movable support arm 182 may be manipulated to position the load engagement member 185 below a center of the fluid-permeable support structure 192 and the rotatable collar may then be manipulated to raise the threaded member 186 until the load engagement member 185 engages the bottom of the fluid-permeable support structure 192, such as in the position shown in FIG. 7. The fluid-permeable support structure 192 and the load engagement member may include complimentary corresponding engagement features (e.g., complimentary corresponding protruding feature on one and recessed feature on the other) for a more stable and secure engagement between them. The securement mechanisms 194 may then be manipulated to release the fluid-permeable support structure 194 from attachment to the tank body 176 so that the entire weight of the fluid-permeable support structure 192 and coffee grounds in the interior volume of the tank body on top of the fluid-permeable support structure 192 is supported by the swing arm assembly 180. The rotatable collar 190 may then be manipulated to lower the threaded member 186 to lower the fluid-permeable support structure 192 supported on the load engagement member 185 until all portions of the fluid-permeable support structure 192 are below the bottom of the tank body with a desired clearance. The movable support member 182 may then be laterally translated to move the fluid-permeable support structure 192 to a side of the tank body 176, thereby opening the interior volume of the tank body 176 to below and permitting the coffee grounds in the interior volume of the tank body 176 to fall out of the open bottom end of the tank body 176. As shown in FIG. 7, a waste receptacle 196 may be positioned in the tank support structure 178 below the tank body 176 to receive falling coffee grounds. The waste receptacle 196 may be disposed below the tank body 176, for example, before releasing the securement mechanisms 194. The waste receptacle may be conveniently sized with a containment volume sufficient to contain all of the coffee grounds from the cold-brewing cycle and may have a height dimension selected to not interfere with operation of the swing arm assembly 180 or with the lateral translation of the fluid-permeable support structure 192 to a side of the tank body 176. For illustration purposes, the waste receptacle 196 has of a cubic shape, but the waste receptacle may, for example be other shapes (e.g. cylindrical, etc.). For convenient use, the waste receptacle 196 may be supported on wheels to permit easy positioning and removal of the waste receptacle under the tank body 176.

Figure 8:
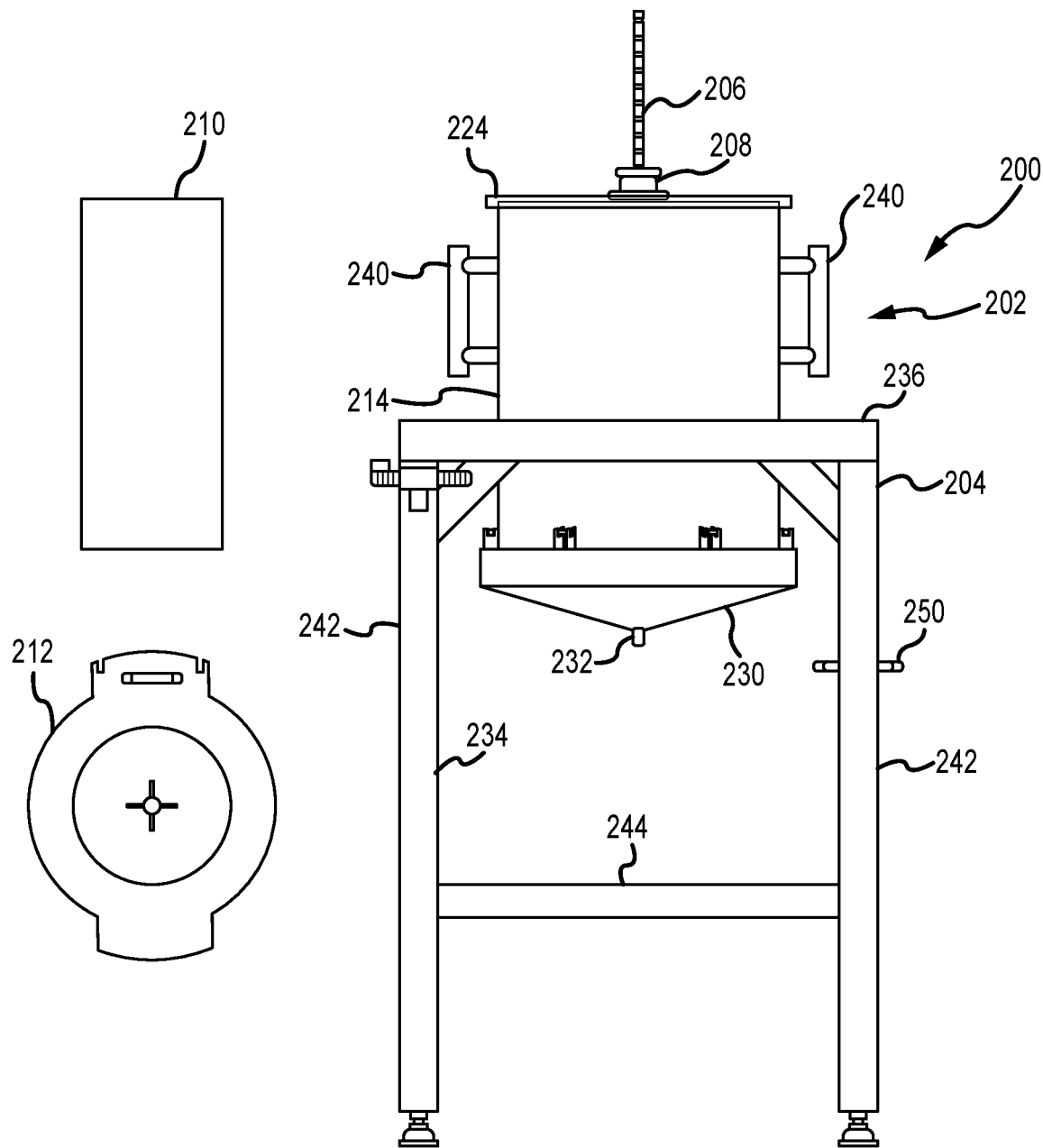
Figure 9:
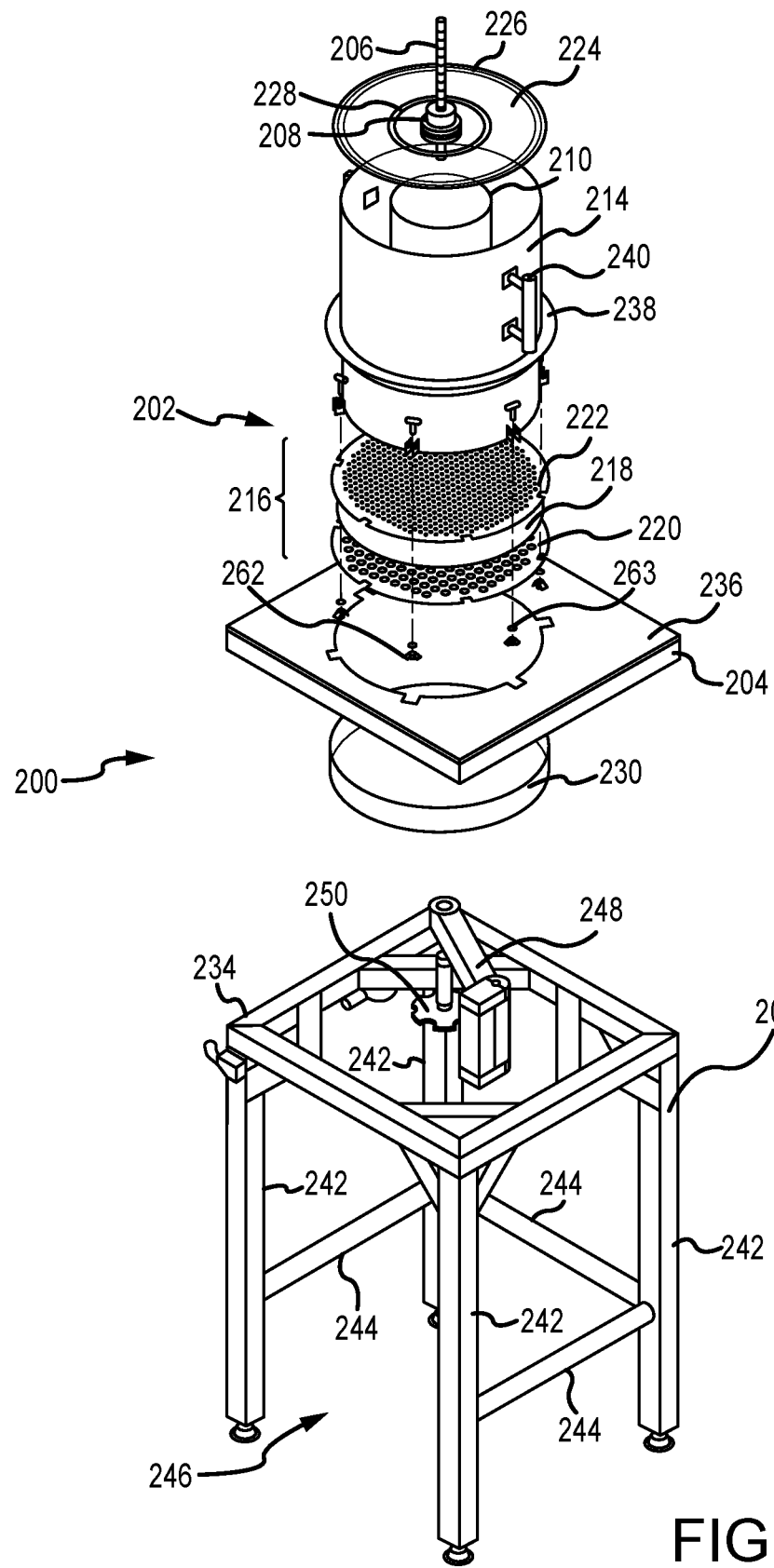

Reference is now made to FIGS. 8-29 in relation to features of another embodiment of a cold-brew coffee brewing system. Referring initially to FIGS. 8 and 9, a cold-brew coffee brewing system 200 is shown. The brewing system 200 includes a brew tank assembly 202 supported in an elevated position by a tank support structure 204. The brewing system 200 also includes a feed water distribution system including a vertically-translatable conduit member 206 that may be locked in place and released for translation through a collet assembly 208, which may be similar to the collet assembly 164 illustrated and described in relation to FIG. 6. As shown in FIG. 8, the cold-brew coffee brewing system 200 includes an optional auxiliary brewing container insert 210 in the form of cylinder open at both ends. The auxiliary brewing container insert 210 may optionally be used to prepare smaller batches of cold-brew coffee. FIG. 8 also shows an optional platen 212 with the brewing system 200, which may beneficially be used in connection with a swing arm assembly, discussed below.

As shown in FIGS. 8 and 9, the brew tank assembly 202 includes a tank body 214 with an interior volume including a bed volume in which a bed of coffee grounds may be disposed for a cold-brewing cycle. The brew tank assembly 202 includes a fluid-permeable support structure 216 comprised of a filter element 218 disposed between first and second rigid permeable members 220 and 222, each in the form of a perforated plate. In alternative implementations, one or both of such rigid permeable members may be in the form of a rigid screen with a mesh size corresponding with the desired opening size through the rigid permeable member. The brew tank assembly 202 also includes a top cover 224. In the configuration shown in FIG. 9, the auxiliary brewing container insert 210 is inserted into and disposed in the interior volume of the tank body 214, resting on and supported by the second rigid permeable member 222. The brew tank assembly 202 may also alternatively be configured to not include the auxiliary brewing container insert 210. The size of the tank body 214 may be sized to operate with beds of coffee grounds suitable for preparing larger batches of cold-brew coffee. The auxiliary brewing container insert 210 permits the beneficial use of the brew tank assembly 202 to make smaller batches of cold-brew coffee than batch sizes for which the tank body 214 may otherwise be designed. When making such smaller batches of cold-brew coffee using the auxiliary brewing container insert 210, the bed of coffee grounds may be confined to the inside of the auxiliary brewing container insert 210, such that the bed of coffee grounds may have a larger bed depth above the second rigid permeable member 222 than if the same amount of coffee grounds were to be disposed across the entire width of the interior volume of the tank body 214. Each rigid permeable member 220 and 222 may have a plurality of openings therethrough for the flow of the cold-brew coffee from the coffee grounds during a cold-brewing cycle for collection below the fluid-permeable support structure. Such openings, in combination with the filter element 218, may be sized to substantially retain the coffee grounds in the bed of coffee grounds above the fluid-permeable support structure, and in particular above the first rigid permeable member 220. In some implementations, such openings in the first rigid permeable member 220 may be sized with a maximum cross-dimension perpendicular to a direction of flow (e.g., diameter for an opening of circular shape) of the cold-brew coffee through the openings in a range of from 1 millimeter to 10 millimeters, and preferably from 2 millimeters to 5 millimeters. The filter element 218 may have a filtration separation size to filter out fine coffee ground particles, and in some implementations may have a filtration separation size in a range of from 15 microns to 150 microns, and preferably from 50 to 100 microns. The second rigid permeable member 222 may have the same or a different opening pattern and size of openings as the first rigid permeable member 220. In some other implementations, the second rigid permeable member 222 may have openings of a size larger than the openings of the first rigid permeable member 220. The openings of the second rigid permeable member 222, whether of the same of different size as the openings of the first rigid permeable member 220, may have a maximum cross-dimension in a range as identified above for the first rigid permeable member 220. Alternatively, the openings of the second rigid permeable member 222 may have a maximum cross-dimension in a different range, for example in a range of from 5 millimeters to 100 millimeters and preferably 20 millimeters to 50 millimeters. The second rigid permeable member 222 may function primarily to hold the filter element 218 in place and provide protection the filter element from damage during handling and other operations (e.g., during removal of the fluid-permeable support structure 116 from below the tank body 204 as a unit following a cold-brewing cycle or positioning and connecting the fluid-permeable support structure to the tank body 204 in preparation for a new cold-brewing cycle). One advantage with using larger openings in the second rigid permeable member 222 is that the larger openings are less susceptible to plugging than smaller openings.

When making larger batches of cold-brew coffee, the brew tank assembly 202 may be used without the auxiliary brewing container insert 210 disposed in the interior volume of the tank body 214 and the bed of coffee grounds may extend across the entire diameter of the tank body 214 on top of the second rigid permeable member 222. As shown in FIG. 9, the top cover 224 includes two channel recesses 226 and 228 on a bottom side of the top cover 224. The outer channel recess 226 is configured to receive the top edge of the wall of the tank body 214 and the inner channel recess 228 is configured to receive the top edge of the wall of the auxiliary brewing container insert 210 when the auxiliary brewing container insert 210 is disposed for use in the interior volume of the tank body 214. The top cover 224 may, for example, be made of a clear plastic material to permit viewing the interior volume of the tank body 214 to visually monitor contents and progression of a cold-brewing cycle within the tank body 214. The brew tank assembly 202 also includes a collection funnel 230 disposed at the bottom of the brew tank assembly 202. The collection funnel 230 has a fluid outlet 232 through which cold-brew coffee may exit the brew tank assembly 202 during a cold-brewing operation. Such cold-brew coffee exiting the fluid outlet 232 may be directed to a collection receptacle that may be disposed below the brew tank assembly 202 during a cold-brewing cycle. In the embodiment illustrated in FIGS. 8 and 9, the collection funnel 230 may be connected with and supported by the fluid-permeable support structure 216, as discussed further below.

With continued reference to FIGS. 8 and 9, the vertically-translatable conduit member 206 permits adjustment of an elevation of a spray head (not shown) that may be connected to an end of the conduit member 206 to provide a desired vertical separation between the spray head and a top elevation of the bed of coffee grounds disposed in the interior volume of the tank body 214 for a cold-brewing cycle. This permits loading beds of coffee grounds with different top surface elevations within the interior volume of the tank body 214 while maintaining a desired vertical separation from the spray head to ensure appropriate coverage by a feed water dispersion over a top surface of the bed of coffee grounds to promote even percolation of water through the bed of coffee grounds for efficiently cold-brewing high-quality cold-brew coffee. When using the auxiliary brewing container insert 210 to prepare a smaller batch of cold-brew coffee, the spray head may be changed out to a different spray head that provides a smaller dispersion pattern for the feed water dispersion than a spray head that may provide a larger dispersion pattern when the auxiliary brewing container insert 210 is not used. Such spray heads may conveniently be changed out by providing, for example, a threaded connection at the bottom of the vertically-translatable conduit member 206 onto which different spray heads may be conveniently threaded and unthreaded.

As shown in FIGS. 8 and 9, the tank support structure 204 includes a support stand 234 and a platform 236 supported on the support stand 234. The platform 236 includes an opening into which a lower portion of the tank body 214 may be inserted from above until a support ring 238 attached around the outside of the tank body 214 engages the platform 236 to support the tank body 214 and accordingly to support the brew tank assembly 202. The tank body 214 is retained in an elevated position supported by the tank support structure 204 by gravity, and the tank body 214 may easily be removed from the tank support structure 204 by lifting the tank body 214 vertically upward using the handles 240, for example to remove the tank body 214 for cleaning at a cleaning station that may be at different location remote from the tank support structure 204. In an alternative implementation, the tank body 214 may be cleaned in place as supported on the tank support structure.

With the brew tank assembly 202 supported in an elevated position as shown in FIGS. 8 and 9, clearance is provided below the tank assembly 202 for positioning of a receptacle (e.g., collection receptacle or waste receptacle) below the tank body 214, and below the interior volume of the tank body 214. The support stand 234 includes four support legs 242 and stabilizing cross-members 244 between each pair of adjacent support legs 242, except on one of the sides of the support stand 234 there is no cross-member 244, which for convenience will be referred to as the front side of the tank support structure 204. Without a cross-member 244 on the front side of the tank support structure 204, the front side provides a side opening 246 through which a receptacle may be translated to be received within the tank support structure 204 and removably positioned below the tank body 214 and the interior volume of the tank body 214. During a cold-brewing cycle, such a receptacle may be a collection receptacle to receive and collect cold-brew coffee exiting the fluid outlet 232 during a cold-brewing cycle or may be a waste receptacle to receive used coffee grounds falling from an open bottom end of the tank body 214 after removal of the collection funnel 230 and fluid-permeable support structure 216 from the brew tank assembly 202 following a cold-brewing cycle. Conveniently, such a receptacle may be a wheeled receptacle that may be wheeled into place underneath the tank body 214 and conveniently wheeled out from under the tank body 214 for convenient positioning and removal. The side opening 246 through the front side of the tank support structure 204 may conveniently be sized with a vertical clearance and horizontal clearance to accommodate translation of a receptacle of desired size.

With continued reference to FIGS. 8 and 9, the brewing system 200 includes a swing arm assembly 248 including a movable support member pivotally connected to a bracket that is attached to an inside surface of one of the support legs 242. The swing arm assembly 248 includes a vertically-extending threaded member with a screw handle 250 attached to a bottom end of the threaded member. The vertically-extending threaded member may be threaded through a threaded box adjacent the free end of the movable support member and the screw handle 250 may be turned to thread the threaded member through the threaded receptacle to raise and lower the threaded member and correspondingly to raise and lower a load (e.g., the fluid-permeable support structure 216) supported by the threaded member and the movable support member. In FIG. 8, the components of the swing arm assembly 248 are behind one of the support legs 242 and not visible, except for the screw handle 250 projecting to the sides of one of the support legs 242. The swing arm assembly 248 may be used to support the fluid-permeable support structure 216 and used coffee grounds disposed on top of the fluid-permeable support structure 216 during an operation to remove the fluid-permeable support structure 216 from below the interior volume of the tank body 214 to remove used coffee grounds from the interior volume of the tank body 214 following a cold-brewing cycle, similar to as described in relation to the illustrated embodiment of FIG. 7. The swing arm assembly 248 and features thereof are further discussed below.

Reference is now be made to FIGS. 10-22, in combination with FIGS. 8 and 9, regarding various features and subassembly configurations for the cold-brew coffee brewing system 200.

Figure 14:
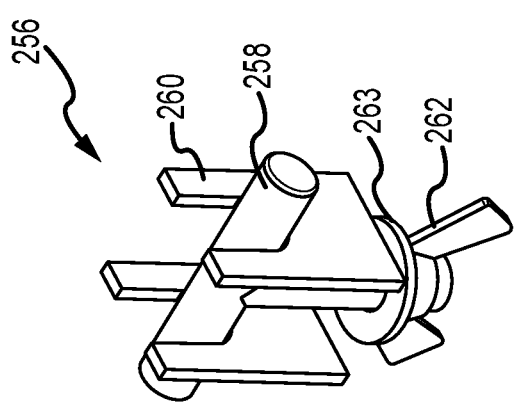

FIGS. 10-14 show various features in relation to the tank body 214 and securement mechanisms for securing the fluid-permeable support structure 216 to the bottom end of the tank body 214. As shown in FIGS. 10-14, the tank body 214 includes an inward-projecting lip 252, angled slightly downward relative to horizontal, located adjacent the bottom end 254 of the tank body 214. The lip 252 helps to direct cold-brew coffee at the bottom of a bed of coffee grounds away from the peripheral edges at the bottom end 254 of the tank body 214. Also shown in FIGS. 10-14 are securement mechanisms 256 adjacent to the bottom end 254 of the tank body 214 and spaced around the perimeter of the outside wall of the tank body 214, for securing the fluid-permeable support structure 216 to the bottom end 254 of the tank body 214. The securement mechanisms 256 include tee bolts 258 (also referred to as T-bolts) retained by brackets 260 projecting outward from the wall of the tank body 214 near the bottom end 254. Also shown are wing nuts 262 threaded onto the threaded bolt ends of the tee bolts 258 with washers 263 between the wing nuts 262 and the brackets 260. Details of the securement mechanisms 256 are best seen in FIGS. 13 and 14.

Figure 15:
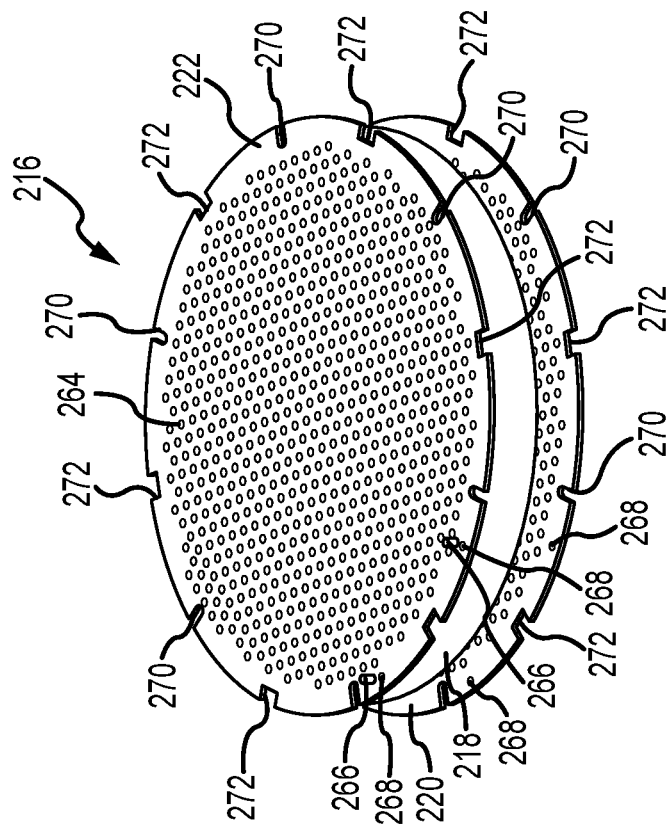
Figure 19:
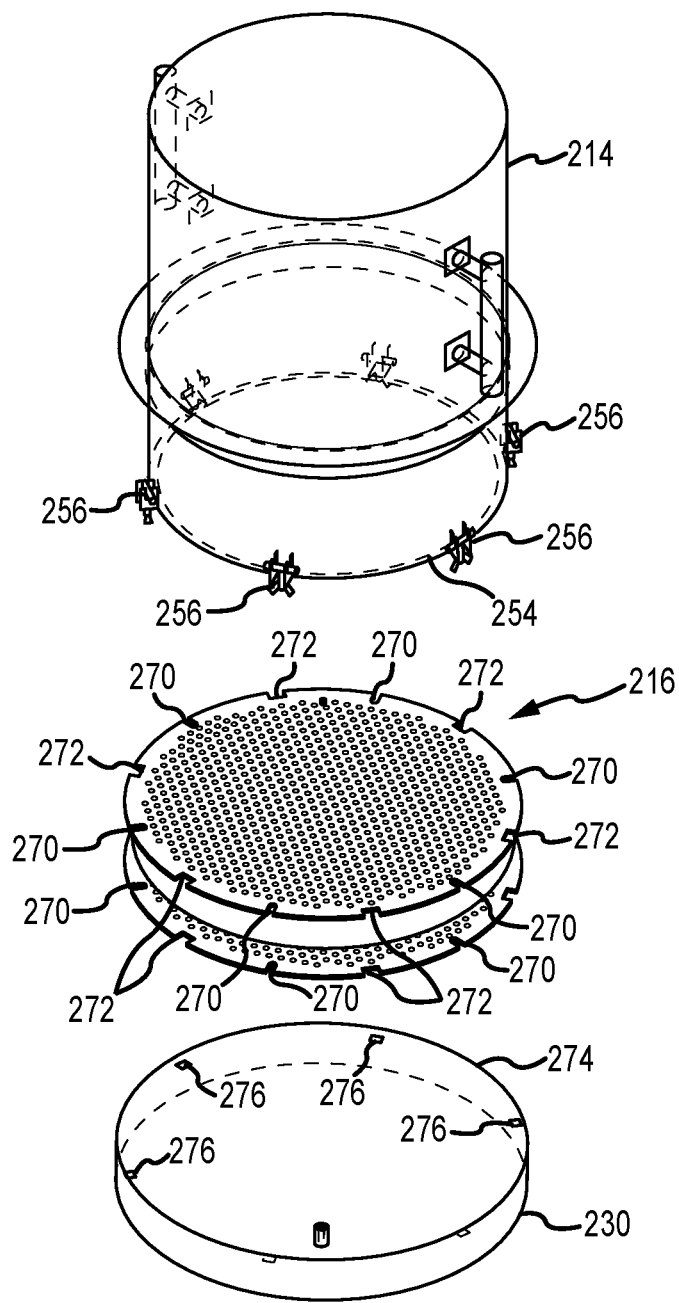

FIGS. 15-19 illustrate various features of the fluid-permeable support structure 216 and the collection funnel 230 and assembly of the fluid-permeable support structure 216, the collection funnel 230 and tank body 214 into the brew tank assembly 202. FIG. 15 shows the fluid-permeable support structure 216 including the filter element 218 disposed between the first rigid permeable member 220 and the second rigid permeable member 222. As shown in FIG. 15, the first rigid permeable member 220 and the second rigid permeable member 222 may have the same design. Each of the rigid permeable members 220 and 222 has a large central region with a grid of perforations 264, providing openings for flow of cold-brew coffee to and from the filter element 218, and an outer peripheral region with features to facilitate incorporation of the fluid-permeable support structure 216 into the brew tank assembly 202. As shown in FIG. 15, the fluid-permeable support structure 216 may include retaining pins 266 disposed through corresponding pin holes 268 of the first and second rigid permeable members 220 and 222, respectively. The retaining pins 266 may extend and project below the bottom side of the first rigid permeable member 220, and such projecting portions of the retaining pins 266 below the bottom side of the first rigid permeable member 220 may beneficially provide engagement locations to assist removal of the fluid-permeable support structure 216 from below the interior volume of the tank body 214 to remove used coffee grounds following a cold-brewing cycle. The outer peripheral portions of the rigid permeable members 220 and 222 include a plurality of correspondingly located edge recesses 270 to engage with the securement mechanisms 256 to secure the fluid-permeable support structure 216 to the tank body 214, and each includes a plurality of correspondingly located edge slots 272 for use to engage the collection funnel 230 with the fluid-permeable support structure 216. FIGS. 16-18 show features of the collection funnel 230. As shown in FIGS. 16-18, the collection funnel 230 includes a vertically-projecting lip portion 274. Projecting from the lip portion 274 inward toward the center of the collection funnel 230 are a plurality of engagement tabs 276 that are sized and located to be received through the edge slots 272 of the first and second rigid permeable members 220 and 222. Engagement of the tank body 214, fluid-permeable support structure 216 and collection funnel 230 into the brew tank assembly 202 is shown in FIG. 19. As shown in FIG. 19, the edge recesses 270 align with the securement mechanisms 256 to receive therethrough the tee bolts of the securement mechanisms 256 and after the tee bolts are received through the edge recesses 270, the washers 263 may be applied and the wing nuts 262 (shown in FIGS. 13 and 14) may be threaded onto the ends of the tee bolts to secure the fluid-permeable support structure 216 to the bottom end 254 of the tank body 214. The engagement tabs 276 on the collection funnel 230 are sized and spaced to be received through the engagement slots 272 of the first and second rigid permeable members 220 and 222. The lip portion 274 of the collection funnel 230 is sufficiently deep to receive the entire depth of the fluid-permeable support structure 216. After the engagement tabs 276 have been translated through the engagement slots 272 to above the top side of second rigid permeable member 222, then the collection funnel may be rotated to a side (clockwise or counter-clockwise) to offset the engagement tabs 276 from the engagement slots 272 to permit the collection funnel 230 to be suspended from the fluid-permeable support structure 216. The lip portion 274 of the collection funnel 230 may extend above the engagement tabs 276 to provide some depth above the engagement tabs 276 to receive a bottom portion of the tank assembly 214. The lip portion 274 may be provided with a depth to accommodate receipt of the fluid-permeable support structure 216 and a desired bottom portion of the tank body 214. For example, in some implementations the lip portion of the collection funnel may have a vertical height, and the fluid-permeable support structure 216 and bottom portion of the tank body 214 together may be received to a depth within the lip portion 274, in a range of from 0.5 centimeter to 20 centimeters and preferably from 3 centimeters to 10 centimeters. In some implementations, the bottom portion of the tank body may be received to a depth within the lip portion 274 in a range of from 0.3 centimeter to 15 centimeters preferably from 0.5 centimeter to 5 centimeters.

Figure 20:
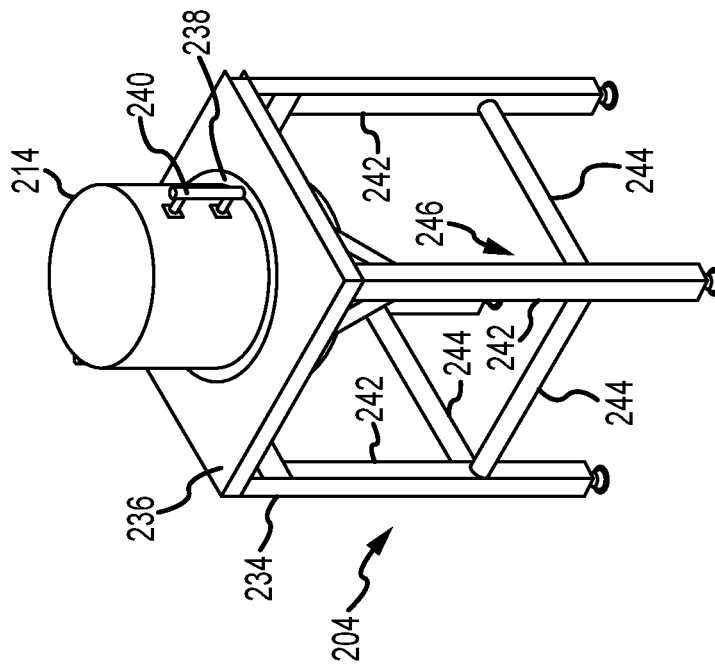
Figure 21:
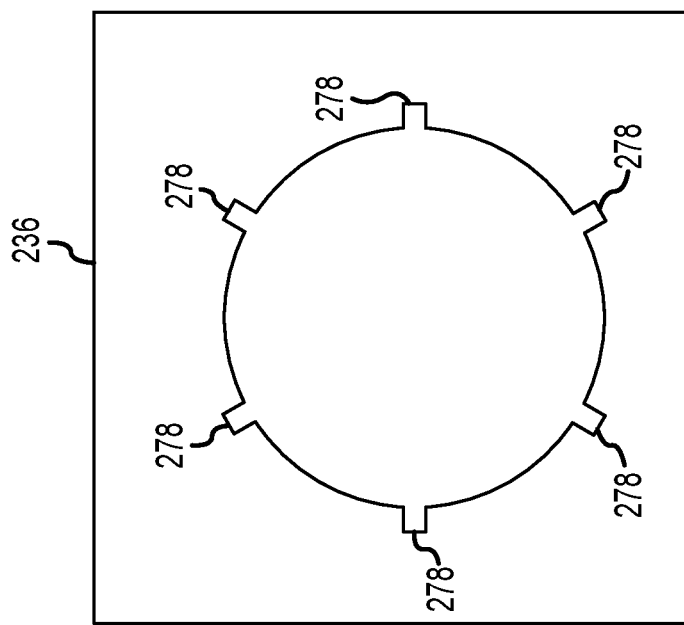

FIGS. 20 and 21 illustrate various features of the tank support structure 204. FIG. 20 shows the tank body 214 supported by the tank support structure 204 by engagement of the support ring 238 with a top surface of the platform 236. As shown in FIG. 21, the opening through the platform 236 includes a plurality of slots 278 sized and spaced to correspond with the securement mechanisms 256 around the bottom end 254 of the tank body 214 to permit the tank body 214 to be inserted into the opening and through the platform 236 from above with the securement mechanisms 256 projecting from the outside walls of the tank body 214. As may be appreciated, the opening through the platform 236 may be sized to accommodate passage therethrough of the fluid-permeable support structure 216 secured to the bottom of the tank body 214 through the engagement mechanisms 256. As may be appreciated, due to the larger diameter of the collection funnel 230 relative to the projections of the securement mechanisms 256 at the sides of the tank body 214, the opening through the platform 236 may be sized to not accommodate passage therethrough of the collection funnel 230, and the collection funnel 230 may be engaged with the fluid-permeable support structure 216 after a preliminary assembly of the tank body 214 and the fluid-permeable support structure 216 have been positioned through the opening of the platform 236. Alternatively, the fluid-permeable support structure 216 may be secured to the bottom of the tank body 214 after the tank body 214 has already been positioned through the opening of the platform to be supported by the support ring 238.

Figure 23:
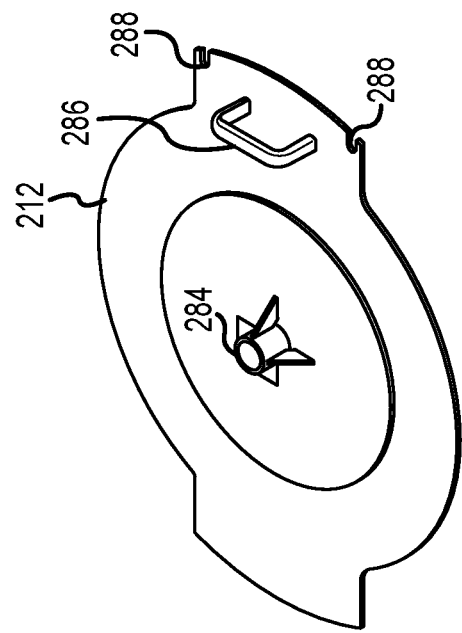
Figure 22:
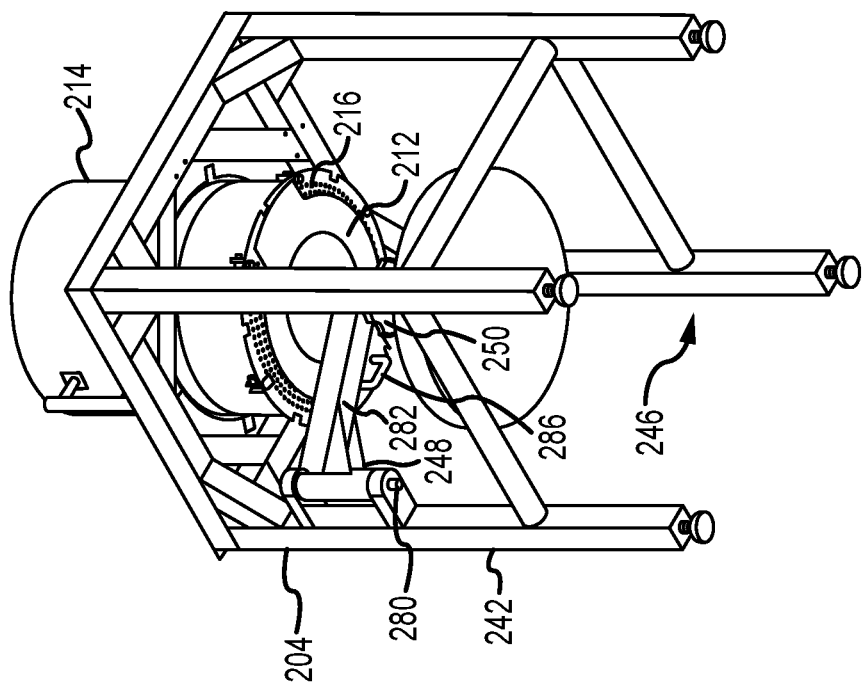

FIGS. 22 and 23 illustrate various features in relation to the swing arm assembly 248 and the platen 212. FIG. 22 shows the tank body 214 supported by the tank support structure 204 and with the fluid-permeable support structure 216 secured to the bottom of the tank body 214, such as may be the case for example after removal of the collection funnel 230 following a cold-brewing cycle in preparation for removing used coffee grounds from the interior volume of the tank body 214. As shown in FIG. 22, the swing arm assembly 248 includes a support bracket 280 attached to one of the support legs 242 of the tank support structure 204 so that the swing arm assembly 248 is supported by the tank support structure 204. Also shown is the movable support member 282 pivotally connected to the support bracket 280 and with the movable support member 282 positioned to support from below the platen 212. Also visible in FIG. 22 is the screw handle 250 that may be turned to raise and lower a vertically-extending threaded member, as previously described with reference to FIG. 9. From this position, the securement mechanisms 256 may be released to free the fluid-permeable support structure 216 from the tank body 214 and the screw handle 250 may be manipulated to lower the platen 212 and the fluid-permeable support structure 216 supported on the platen 212, after which the movable support member 212 may be swung to a side in the direction of the side opening 246 of the tank support structure 204 to translate the fluid-permeable support structure 216 through the side opening 246 to a side of the tank body 214, leaving the bottom end of the tank body 214 open to permit used coffee grounds to fall out of the interior volume of the tank body 214. As previously described, a waste receptacle may be positioned under the interior volume of the tank body 214 to receive such falling coffee grounds. As shown in FIGS. 22 and 23, the platen 212 has a centrally-located receptacle 284 on a bottom side to engage a top end of the threaded member of the swing arm assembly 248 to be raised and lowered as the threaded member is raised and lowered through manipulation of the screw handle 250. The platen 212 also includes a handle 286 projecting down from the bottom side of the platen 212. The handle 286 may conveniently be used to pull the platen and consequently the movable support member 282 toward and through the side opening 246 of the tank support structure 204. The platen 212 also includes two notches 288 on one side adjacent the handle. The notches 288 are configured to engage the downwardly projecting ends of the retaining pins 266 (shown in and described previously in relation to FIG. 15) that project below the bottom side of the first rigid permeable member 220 of the fluid-permeable support structure 216 to retain the fluid-permeable support structure 216 in a fixed relationship to the platen 212 as the movable support member 282 is swung to the side as the handle 286 is pulled to remove the fluid-permeable support structure 216 from below the interior volume of the tank body 214.

Figure 25:
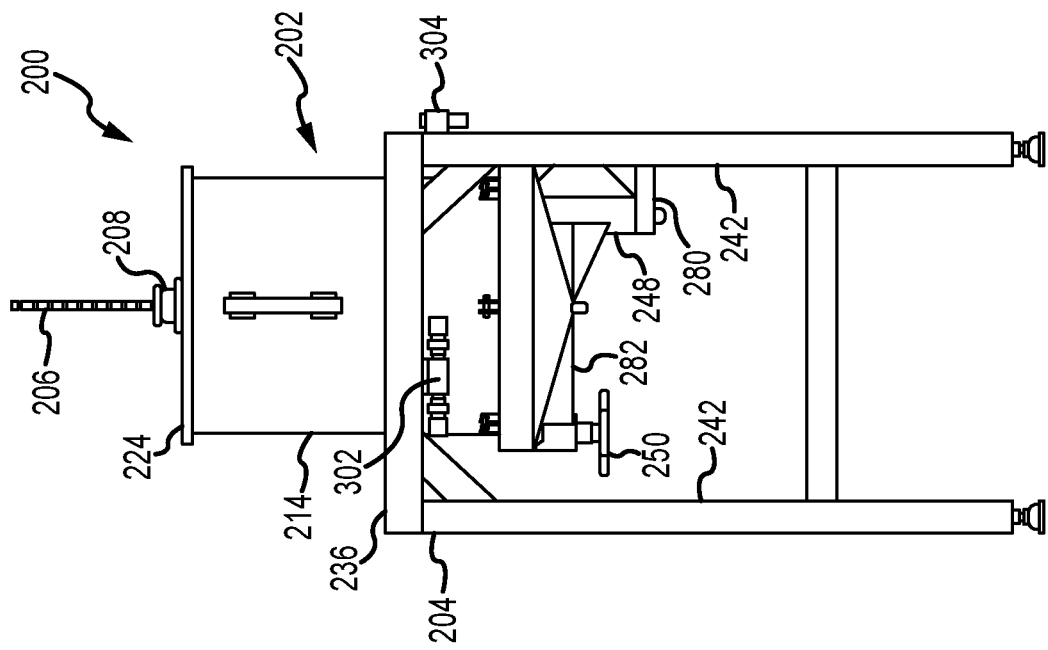
Figure 24:
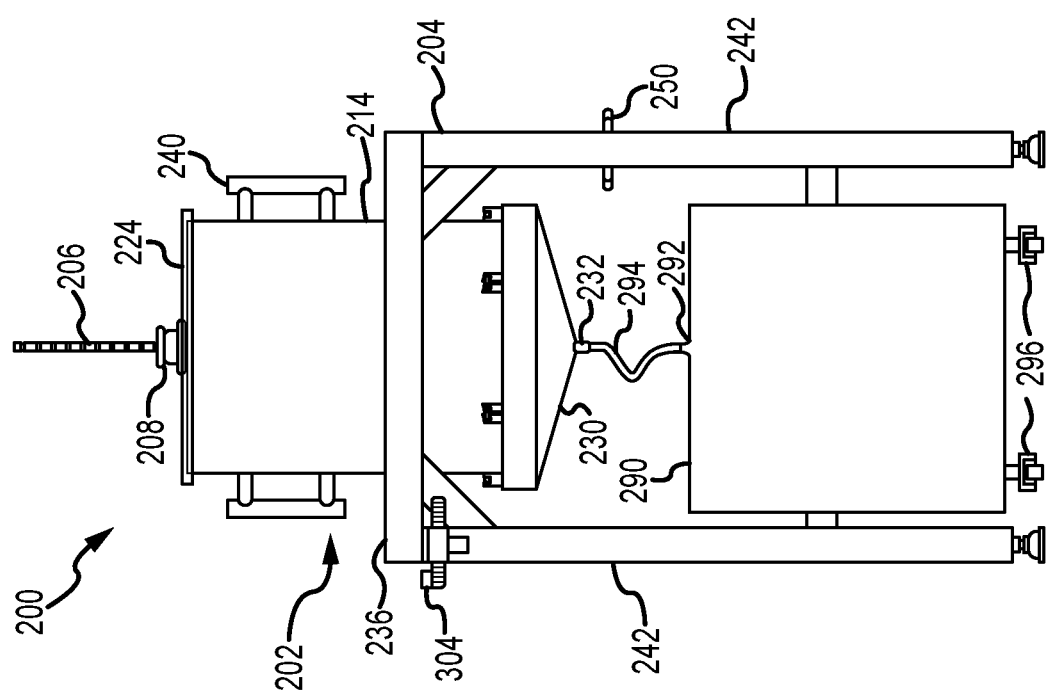

Reference is now made to FIGS. 24-29 to further describe features of the cold-brew coffee brewing system 200 of FIGS. 8 and 9. FIGS. 24 and 25 show a front side view and left side view, respectively, of the brew tank assembly 202 as shown in FIG. 8 with the brew tank assembly 202 assembled in a configuration for brewing cold-brew coffee during a cold-brewing cycle. In FIG. 24 a collection receptacle 290 is shown received in the tank support structure 204 and positioned below the collection funnel 230 with the fluid outlet 232 fluidly interconnected with a fluid inlet 292 of the collection receptacle 290 through tubing 294 for fluid transmission of cold-brew coffee exiting the brew tank assembly 202 to the collection receptacle 290 for collection. The collection receptacle 290 may have a sufficiently large fluid containment volume to contain the total volume of cold-brew coffee prepared during a cold-brewing cycle. As shown in FIG. 24, the collection receptacle 290 may be supported on wheeled rollers 296 permitting the collection receptacle 292 to be wheeled into position in the tank support structure 204 under the tank body 214 and to be removed from the tank support structure 204. As shown in FIG. 25, the movable support member 282 of the swing arm assembly 248 may be swung to a side and out of the way to permit the collection funnel to be engaged with the fluid-permeable support structure 216 in the brew tank assembly 202.

Figure 27:
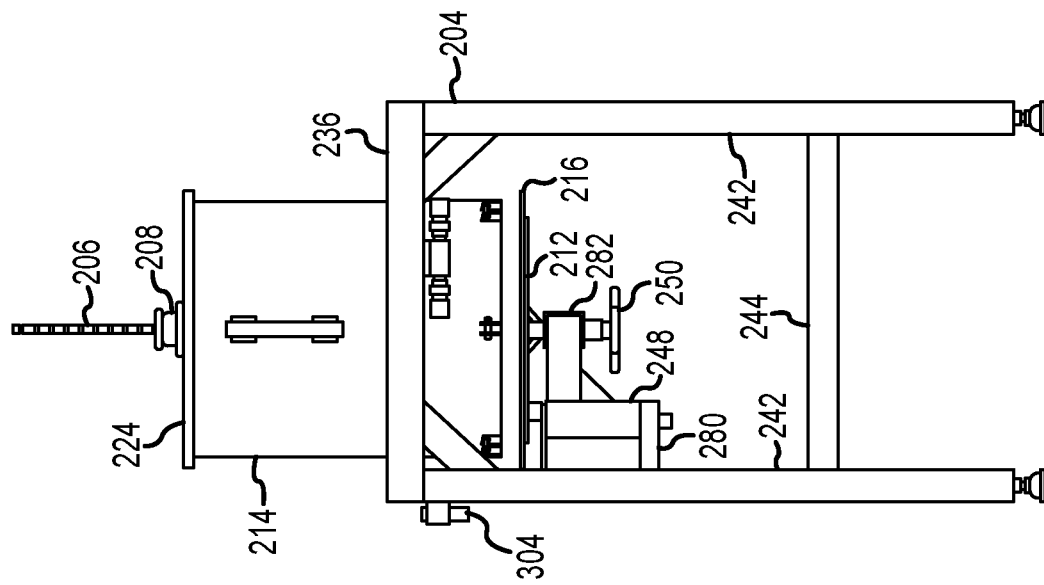
Figure 26:
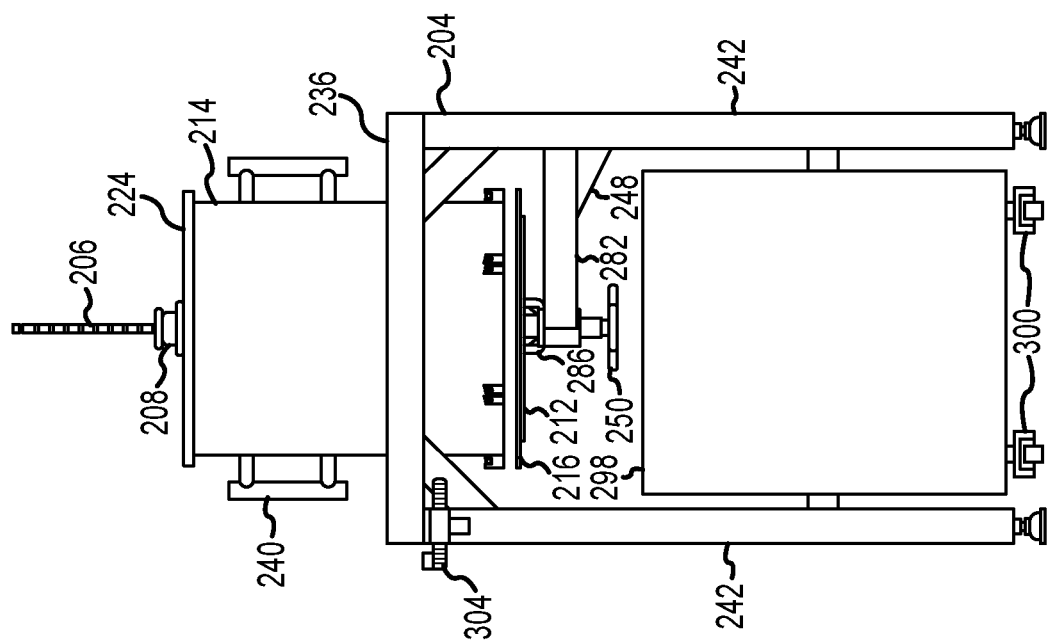

FIGS. 26 and 27 show a subassembly of components of the cold-brew coffee brewing system 200 such as may be the case following a cold-brewing cycle in preparation to move the fluid-permeable support structure 216 from below the interior volume of the tank body 214 for removal of used coffee grounds. As seen in FIGS. 26 and 27, the fluid-permeable support structure 216 is unsecured from the bottom of the tank body 214 and is supported on the platen 212 by the swing arm assembly 248, with the vertical adjustment mechanism of the swing arm assembly 248 lowered using the screw handle 250 to a position where the fluid-permeable support structure 216 may be translated to the side of the tank body 214 to provide direct access into the open bottom end of the tank body 214, for example to remove used coffee grounds or to clean the inside of the tank body 214. The positioning as shown in FIGS. 26 and 27 may also, for example, be utilized when positioning the fluid-permeable support structure 216 for securement to the tank body 214 in preparation for a cold-brewing cycle. In FIG. 26 a waste receptacle 298 is shown received in the tank support structure 204 positioned below the tank body 214, for example to receive used coffee grounds that may fall from the interior volume of the tank body 214 when the swing arm assembly 248 is swung to the side to translate the fluid-permeable support structure 216 to a side of the tank body 214. As shown in FIG. 26, the waste receptacle 298 may be supported on wheeled rollers 300 to permit the waste receptacle 298 to be conveniently wheeled into position in the tank support structure 204 under the tank body 214 and to be removed from the tank support structure 204. The waste receptacle 298 may be conveniently sized with a sufficient internal containment volume to receive all of the used coffee grounds from the tank body 214 used in a cold-brewing cycle.

Figure 29:
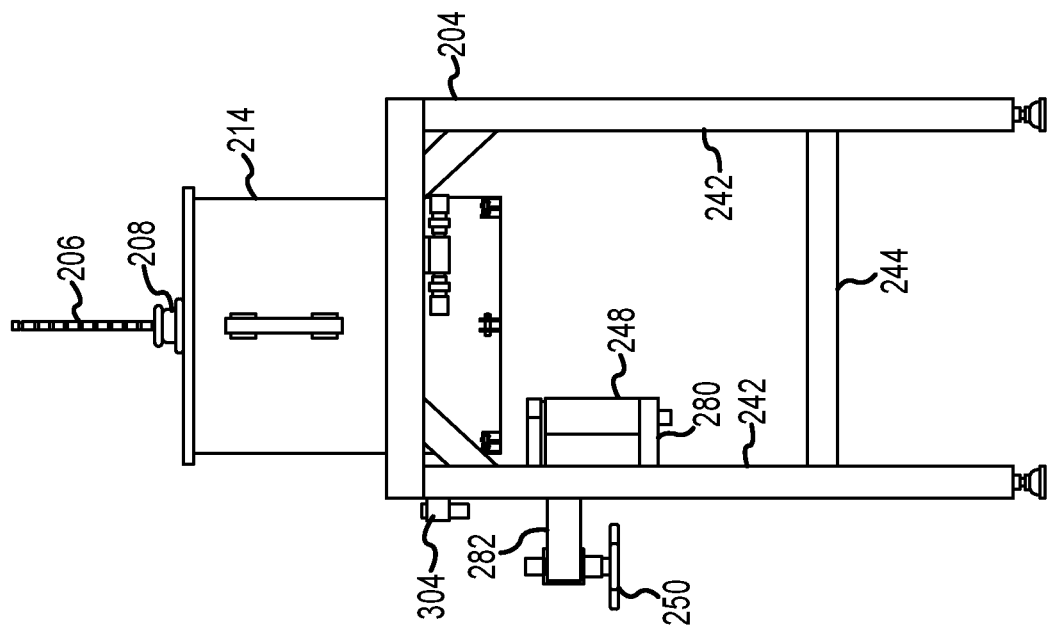
Figure 28:
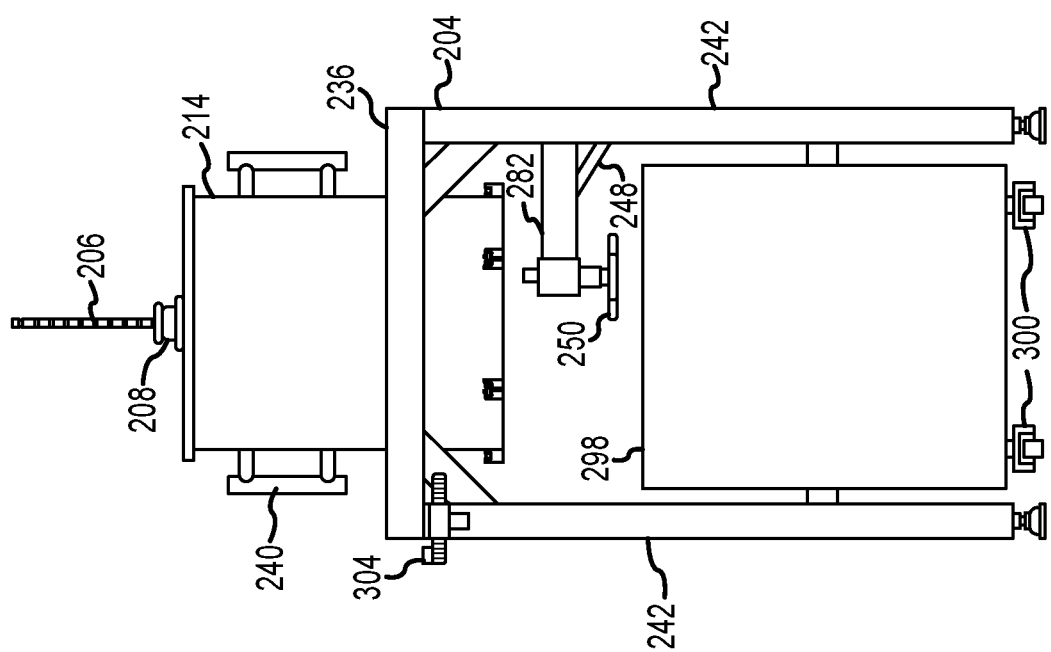

FIGS. 28 and 29 show a subassembly of components of the cold-brew coffee brewing system 200 in which the tank body 214 is supported in an elevated position by the tank support structure 204, such as may be the case for example following a cold-brewing cycle after removal of the fluid-permeable support structure 216 or in preparation for assembling the brew tank assembly 202 to start a new cold-brewing cycle. FIGS. 28 and 29 illustrate the movable support member 282 of the swing arm assembly 248 being swung to a side of the tank support structure 204 and not positioned below the tank body 214. Also illustrated in FIG. 28 is the waste receptacle 298 received within the tank support structure 204.

With reference primarily to FIGS. 8, 9, 24 and 25, the cold-brew coffee brewing system 200 may also include process monitoring and control features similar to those provided by the flow sensor unit 144, flow control valve 146 and controller unit 148 as illustrated and described in relation to FIG. 1. As seen best in FIGS. 24 and 25, the cold-brew coffee brewing system includes a flow sensor unit 302 and a flow control valve 304 mounted on the tank support structure 204. The flow sensor unit 302 and the flow control valve 304 may perform similarly to as described for the flow sensor unit 144 and the flow control valve 146 as described in relation to FIG. 1, and each may be connected with a controller unit to communicate and interact with the controller unit, similar to as described above with respect to the controller unit 148 shown in FIG. 1. Flow of feed water in the cold-brew coffee brewing system 200 may be first through the flow control valve 304 and then through the flow sensor unit 302 and then to the vertically-translatable conduit member 206. Such flow components may be fluidly interconnected by appropriate fluid conduits, for example flexible or rigid plastic or metal tubing. The flow sensor unit 302 and flow control valve 304 may be incorporated into a brew control system in which the flow sensor unit 302 may provide sensor signals indicative of monitored water feed rate to a controller unit, which may have an electronic controller to process information of the sensor signals and direct generation of flow control signals to the flow control valve 304 to manipulate the flow control valve and change the water feed rate as appropriate. The cold-brew coffee brewing system may incorporate a user interface manipulable by a human user to specify brewing instructions executable by an electronic controller of a controller unit to control performance of a cold-brewing cycle. As previously discussed, such a brew control system may be configured to include user-defined input in the brewing instructions executed by the electronic controller to control the cold-brewing cycle. Some or all of such user-defined input may be optional at the option of the user, through such a user interface. Such a brew control system may be operable in an automatic mode and/or in a manual mode in which a user may override one or more operating parameters otherwise set through the automatic mode.

With reference primarily to FIGS. 24-29, the swing arm assembly 248 may be configured to provide a vertical clearance below the moveable support member 282 to permit a waste receptacle sized to receive used coffee grounds from a cold-brewing cycle or a collection receptacle to receive cold brew coffee prepared during a cold-brewing cycle. In some implementations, the swing arm assembly may provide a vertical clearance of below the moveable support member 282 of at least 40 centimeters and preferably at least 60 centimeters, to accommodate a receptacle with a vertical height dimension up to the vertical clearance to be received in the tank support structure 204 and positioned under the interior volume, and in particular while the fluid-permeable support structure 216 is translated by the swing arm assembly 248 from below the interior volume to the side of the tank body without obstruction by the waste receptacle. In some implementations, the side opening 46 may have a vertical clearance dimension in a range of at least 40 centimeters and preferably at least 60 centimeters, and may be in a range of from 40 centimeters to 120 centimeters and preferably from 60 centimeters to 90 centimeters, over a horizontal clearance dimension of at least 40 centimeters and preferably at least 50 centimeters, and may be in a range of from 40 centimeters to 120 centimeters and preferably from 50 centimeters to 80. In some implementations, a collection receptacle may have a vertical height dimension, including wheels when the collection receptacle includes wheels, in a range of from 20 centimeters to 100 centimeters and preferably from 40 centimeters to 80 centimeters, and may have a horizontal width dimension in a range of from 20 centimeters to 100 centimeters and preferably from 40 centimeters to 80 centimeters. In some implementations, the collection receptacle may have a fluid containment volume, to receive and hold cold-brew coffee, in a range of from 10 liters to 300 liters. In some implementations, a waste receptacle may have a vertical height dimension, including wheels when the waste receptacle includes wheels, in a range from 20 centimeters to 100 centimeters and preferably from 40 centimeters to 80 centimeters, and may have a horizontal width dimension in a range of from 20 centimeters to 100 centimeters and preferably from 40 centimeters to 80 centimeters. The area in the tank support structure available to receive such a collection receptacle or waste receptacle may have a horizontal depth dimension in from the side opening, for example, with dimensions as described for the horizontal width dimension of the side opening.

The versatile configuration of the cold-brew coffee brewing system (e.g., cold-brew coffee brewing system 100 or 200), with noted adjustable features, provides capability to prepare high-quality, cold-brew coffee in batches of varying size and prepared relative to varying specifications as desired by a user. In some implementations, the cold-brew coffee brewing system may accommodate loading coffee grounds of varying quantities into the interior volume for a cold-brewing cycle. In some implementations, a total quantity of from 1 kilogram to 50 kilograms, preferably from 1 kilogram to 35 kilograms, of fresh coffee grounds may be disposed in a bed volume in the interior volume for a cold-brewing cycle. In some implementations, the bed of coffee grounds may have a vertical height of from 2.5 to 50 centimeters, for example extending above the fluid-permeable support structure. As may be appreciated, optional use of an auxiliary brewing container insert (such as the auxiliary brewing container insert 210) may provide for enhanced control of cold-brewing cycle conditions over an expanded range of batch sizes. In some implementations, a cumulative quantity of the feed water introduced into the interior volume over the bed of coffee grounds during a cold-brewing cycle may be in a range of from 10 liters to 300 liters, and an equivalent amount of cold-brew coffee may be collected, minus residual water retained in the coffee grounds. The cold-brew coffee brewing system may provide versatility in accommodating preferences of different users to prepare cold-brew coffee according to different desired specifications. In some implementations, a ratio of the cumulative quantity of the feed water to the total quantity of the coffee grounds for a cold-brewing cycle may be varied within a range of from 3 liters to 25 liters, and preferably from 3 liters to 10 liters, of the feed water per kilogram of the coffee grounds. In some implementations, a cumulative quantity of the cold-brew coffee to the total quantity of the coffee grounds may be in a range of from 2 liters to 20 liters, and preferably from 2 liters to 10 liters, of the cold-brew coffee per kilogram of the coffee grounds. Such variability in cold-brewing cycle conditions may beneficially be accommodated and controlled by a brew control system. A cumulative quantity of cold-brew coffee collected during a cold-brewing cycle may in some implementations be varied in a range of from 10 liters to 300 liters. In some implementations, a ratio of cumulative quantity of cold-brew coffee collected to the total quantity of the coffee grounds for a cold-brewing cycle may be varied in a range of from 2 to 20 liters of cold-brew coffee per kilogram of the coffee grounds. In some implementations an average feed rate of feed water introduced into the interior volume during a cold brewing cycle may be varied in a range of from 130 to 600 milliliters per minute.

Some other contemplated embodiments of example implementation combinations for various aspects of this disclosure, with or without additional features as disclosed above or elsewhere herein, are summarized as follows:

1. A cold-brew coffee brewing system, the system comprising: a brew tank assembly, comprising:
    a tank body with an interior volume including a bed volume to contain a bed of the coffee grounds during cold-brewing cycles to brew cold-brew coffee;
    a top cover disposed to enclose the bed volume from above during a said cold-brewing cycle and being selectively removable to access the interior volume to load coffee grounds in the bed volume for a said cold-brewing cycle; and
    a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
    a feed water distribution system in fluid communication with the interior volume and configured to distribute a dispersion of feed water over a top surface area of the bed of the coffee grounds disposed in the bed volume during a said cold-brewing cycle; and
    a tank support structure supporting the tank body in an elevated position during a said cold-brewing cycle;
wherein:
    the top cover is selectively removable to access the interior volume from above through an open top end of the tank body to load fresh said coffee grounds into the bed volume for a said cold-brewing cycle;
    the fluid-permeable support structure is selectively removable from below the bed volume with the tank body supported in the elevated position by the tank support structure for removal of used said coffee grounds from the interior volume through an open bottom end of the tank body following a said cold-brewing cycle; and
    in the elevated position the tank body has a vertical clearance below the open bottom end of the tank body to receive a waste container below the interior volume to receive the used said coffee grounds removed from the interior volume through the open bottom end of the tank body.

2. The cold-brew coffee brewing system of example combination 1, further comprising a brew control system for controlling a said cold-brewing cycle, wherein the brew control system comprises:
- a flow sensor unit with a flow sensor positioned to monitor water feed rate to the feed water distribution system for the dispersion of feed water during a said cold-brewing cycle;
- a controller unit in communication with the flow sensor unit to receive and process sensor signals generated by the flow sensor unit indicative of the monitored water feed rate, the controller unit including an electronic controller to process information of the sensor signals and direct generation of flow control signals from the controller unit; and
- a flow control unit including a control valve manipulable to change the water feed rate, the flow control unit in communication with the controller unit to receive the flow control signals to manipulate the control valve to change the water feed rate.

3. The cold-brew coffee brewing system of example combination 2, wherein the brew control system comprises a user interface manipulable by a human user to specify brewing instructions executable by the electronic controller to control a said cold-brewing cycle.

4. The cold-brew coffee brewing system of either one of example combination 2 or example combination 3, wherein the brew control system is configured to include in the brewing instructions predefined fields of user-defined input that is inputtable into the brew control system by a user through the user interface, the user-defined input including user-specified quantity of the coffee grounds loaded into the interior volume for a said cold-brewing cycle.

5. The cold-brew coffee brewing system of example combination 4, wherein the brew control system is operable in an automatic mode to automatically set and control the water feed rate and duration of water feed during a said cold-brewing cycle; and
the user-defined input includes at least one optional input field for a user to optionally input through the user interface at least one parameter for a said cold-brewing cycle to modify at least one of the water feed rate and duration of water feed relative to the automatic mode.

6. The cold-brew coffee brewing system of example combination 5, wherein the at least one optional input field includes at least one of target volume yield of cold-brew coffee and total brew time for a said cold-brewing cycle.

7. The cold-brew coffee brewing system of any one of example combinations 2-6, further comprising a data recorder in communication with the electronic controller and configured to record for the brewing cycle, at the direction of the electronic controller, at least one of total feed water input, total brew time, extraction ratio of volume of cold-brew coffee produced per unit quantity of coffee grounds, and actual volume yield of cold-brew coffee produced.

8. The cold-brew coffee brewing system of any one of example combinations 1-7, wherein the fluid-permeable support structure comprises a rigid permeable member and filter element disposed above the rigid permeable member.

9. The cold-brew coffee brewing system of example combination 8, wherein the rigid permeable member comprises a plurality of openings therethrough for the flow of the cold-brew coffee, wherein the openings each has a maximum cross-dimension perpendicular to a direction of flow of the cold-brew coffee through the openings in a range of from 2 millimeters to 5 millimeters.

10. The cold-brew coffee brewing system of either one of example combination 8 or example combination 9, wherein the rigid permeable member is a perforated plate.

11. The cold brew coffee brewing system of any one of example combinations 8-10, wherein the filter has a separation size of in a range of from 15 microns to 150 microns.

12. The cold-brew coffee brewing system of any one of example combinations 8-11, wherein the rigid permeable member is a first rigid permeable member and the fluid-permeable support structure comprises a second permeable member disposed above the filter element, and optionally the openings through the second rigid permeable member each has a said maximum cross-dimension that is larger than the said maximum cross-dimension of the first rigid permeable member.

13. The cold-brew coffee brewing system of any one of example combinations 1-12, wherein the fluid-permeable support structure is removably connected to the tank body, and when connected to the tank body the fluid-permeable support structure is supported by the tank body.

14. The cold-brew coffee brewing system of any one of example combinations 1-13, wherein the fluid-permeable support structure and the interior volume of the tank each has an outer edge perimeter perpendicular to a longitudinal axis of the tank body, and no portion of the outer edge perimeter of the interior volume extends laterally beyond the outer edge perimeter of the fluid-permeable support structure.

15. The cold-brew coffee brewing system of any one of example combinations 1-14, wherein the fluid permeable support structure is removably connected to an outside wall of the tank body.

16. The cold-brew coffee brewing system of any one of example combinations 1-15, wherein the brew tank assembly comprises a collection funnel disposed to receive the cold-brew coffee exiting from the fluid-permeable support structure during a said cold-brewing cycle, the collection funnel including a fluid outlet through which the cold-brew coffee exits the brew tank assembly during a said cold-brewing cycle, the collection funnel being selectively removable from the brew tank assembly together with or separate from the fluid-permeable support structure to permit removal of the used coffee grounds from the interior volume following a said cold-brewing cycle.

17. The cold-brew coffee brewing system of example combination 16, wherein the collection funnel is supported by the permeable support structure, and is selectively removable from the permeable support structure.

18. The cold-brew coffee brewing system of any one of example combinations 1-17, wherein the collection funnel comprises an upwardly-projecting peripheral lip portion.

19. The cold-brew coffee brewing system of example combination 18, wherein at least a bottom portion of the fluid-permeable structure is removably received in the peripheral lip portion of the collection funnel for a said cold-brewing cycle.

20. The cold-brew coffee brewing system of either one of example combination 18 or example combination 19, wherein at least a bottom portion of the tank body is received in the lip portion of the collection funnel for a said cold-brewing cycle.

21. The cold-brew coffee brewing system of any one of example combinations 18-20, wherein for a said cold-brew brewing cycle, at least a bottom portion of the tank body is received in the lip portion of the collection funnel and at least a bottom portion of the fluid-permeable support structure disposed below the bottom portion of the tank body is received in the lip portion of the collection funnel.

22. The cold-brew coffee brewing system of any one of example combinations 18-21, wherein the lip portion of collection funnel has a vertical height in a range of from 1 centimeter to 10 centimeters.

23. The cold-brew coffee brewing system of any one of example combinations 1-22, comprising a swing arm assembly with a movable support member configured for lateral articulating movement at an elevation lower than a bottom elevation of the tank body, and wherein:
the movable support member is positionable below the tank body to support at least the fluid-permeable support structure and to swing to a side to laterally translate the fluid-permeable support structure from below the interior volume to a side of the tank body with the fluid-permeable support structure supported by the movable support member, to provide access into the interior volume from below without obstruction from fluid-permeable support structure for removal of the used coffee grounds from the bed volume through the open end of the tank body.

24. The cold-brew coffee brewing system of example combination 23, wherein the swing arm assembly comprises a vertical adjustment mechanism to vertically adjust the elevation at which the fluid-permeable support structure is supported by the movable support member, to raise and lower the fluid-permeable support structure for engagement and disengagement of the fluid permeable support structure with the tank body.

25. The cold-brew coffee brewing system of example combination 24, wherein the vertical adjustment mechanism comprises a vertical screw adjustment mechanism.

26. The cold-brew coffee brewing system of any one of example combinations 23-25, wherein the swing arm assembly is supported by the tank support structure.

27. The cold-brew coffee brewing system of any one of example combinations 23-26, wherein the swing arm assembly is configured to provide a vertical clearance below the moveable support member to permit a waste receptacle having a height of at least 80 cm to be received in the tank support structure and positioned under the interior volume while the fluid-permeable support structure is translated by the swing arm assembly from below the interior volume to the side of the tank body without obstruction by the waste receptacle.

28. The cold-brew coffee brewing system of any one of example combinations 1-27, wherein the feed water distribution system comprises a fluid feed line in fluid communication with a water dispersion generator to generate the dispersion of feed water.

29. The cold-brew coffee brewing system of example combination 28, wherein the water dispersion generator comprises a fluid manifold cavity in the top cover and an array of drip orifices through a bottom of the top cover in fluid communication with the fluid manifold cavity to drip the dispersion of feed water.

30. The cold-brew coffee brewing system of example combination 29, wherein the water dispersion generator comprises a fluid spray head disposed in the interior volume of the tank to spray the dispersion of feed water 31. The cold-brew coffee brewing system of example combination 30, wherein the spray head is supported on a vertically adjustable support that is vertically adjustable to raise and lower the elevation of the spray head in the interior volume to permit setting a vertical standoff between the spray head and a top surface of the bed of the coffee grounds in the bed volume during a said cold-brewing cycle.

32. The cold-brew coffee brewing system of example combination 31, wherein the vertically adjustable support comprises a vertically translatable conduit member extending through the top cover and a locking mechanism supported by the top cover, the locking mechanism being manipulable between an unlocked configuration in which the vertically translatable conduit is translatable to change the elevation of the spray head in the interior volume and a locked configuration in which the translatable conduit is locked in place relative to the top cover with the spray head set at a fixed elevation in the interior volume.

33. The cold-brew coffee brewing system of example combination 32, wherein the locking mechanism comprises a collet assembly with a collet nut that is rotatable to manipulate the locking mechanism between the locked and unlocked configurations.

34. The cold-brew coffee brewing system of any one of example combinations 1-33, comprising a said bed of the coffee grounds disposed in the bed volume and supported by the fluid-permeable support structure.

35. The cold-brew coffee brewing system of example combination 34, wherein the bed of the coffee grounds in the volume has a vertical height in a range from 2.5 centimeters to 50 centimeters.

36. The cold-brew coffee brewing system of either one of example combination 34 or example combination 35, further comprising a vertical separation between a lowermost water outlet of the feed water distribution system and a top elevation of the bed of the coffee grounds in the interior volume, wherein the vertical separation is in a range of from 10 centimeters to 30 centimeters.

37. The cold-brew coffee brewing system of any one of example combinations 1-36, wherein the tank support structure comprises a side opening for receiving a receptacle to be removably positioned below the interior volume of the tank body by translating the receptacle through the side opening.

38. The cold-brew coffee brewing system of example combination 37, wherein the side opening has a vertical clearance dimension in a range of from 40 centimeters to 120 centimeters over a horizontal clearance dimension in a range of from 20 centimeters to 100 centimeters.

39. The cold-brew coffee brewing system of either one of example combination 37 or example combination 38, comprising a wheeled collection receptacle configured to be wheel-translatable through the side opening to be received in the tank support structure positioned to collect the cold-brew coffee exiting the brew tank assembly during a said cold-brewing cycle.

40. The cold-brew coffee brewing system of example combination 39, wherein the collection receptacle has a vertical height dimension in a range of from 20 centimeters to 100 centimeters and a fluid containment volume in a range of from 10 liters to 300 liters.

41. The cold-brew coffee brewing system of either one of example combination 39 or example combination 40, wherein the collection receptacle is received in the tank support structure positioned to collect the cold-brew coffee exiting the tank assembly during a said cold-brewing cycle.

42. The cold-brew coffee brewing system of any one of example combinations 37-41, comprising a waste receptacle that is configured to be translatable through the side opening to be received in the tank support structure positioned to receive the used coffee grounds falling from the interior volume when the fluid-permeable support structure is moved from below the bed volume for removal of the used coffee grounds through the open end of the tank body.

43. The cold-brew coffee brewing system of example combination 42, wherein the waste receptacle is a wheeled waste receptacle configured to be wheel-translatable through the side opening.

44. The cold-brew coffee brewing system of either one of example combination 42 or example combination 43, wherein the waste receptacle has a vertical height dimension in a range of from 20 centimeters to 100 centimeters.

45. The cold-brew coffee brewing system of any one of example combinations 1-44, wherein the entire brew tank assembly is supported by the tank support structure.

46. The cold-brew coffee brewing system of any one of example combinations 1-45, wherein as supported by the tank support structure a portion of the tank body is received in the tank support structure by insertion from above into a top opening in the tank support structure to engage and be supported by the tank support structure, and wherein the tank body is removable from the tank support structure by withdrawing the inserted portion of the tank body upward through the top opening to disengage the tank body from tank support structure, and wherein after removal the tank body is re-insertable from above through the top opening to reengage and be supported by the tank support structure.

47. The cold brew coffee brewing system of example combination 46, wherein as supported by the tank support structure the tank body is held in place in engagement with the tank support structure by gravity and is disengageable from the tank support structure by lifting the tank body and without releasing any securement mechanisms.

48. A method of cold-brewing coffee, the method comprising:
  loading the coffee grounds into an interior volume of a tank body of a brew tank assembly or a cold-brew coffee brewing system, wherein the brew tank assembly comprises:
    a tank body with the interior volume including a bed volume to contain coffee grounds in a bed of the coffee grounds during cold-brewing cycles to brew cold-brew coffee;
    a top cover to enclose the interior volume from above during a said cold-brewing cycle and being selectively removable to access the interior volume; and
    a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
  wherein as loaded into the interior volume during the loading, the coffee grounds are in a bed of the coffee grounds contained in the bed volume;
  after the loading, introducing feed water into the interior volume above the coffee grounds through a feed water distribution system in fluid communication with the interior volume and configured to distribute a dispersion of feed water over a top surface area of the bed of the coffee grounds disposed in bed volume;
  performing the introducing feed water until a total quantity of feed water has been introduced into the interior volume for a complete said cold-brewing cycle;
  permitting water from the feed water to percolate through the coffee grounds; and
  collecting the cold-brew coffee passing through the permeable support structure and exiting the tank assembly;
  after the collecting the cold-brew coffee, removing the fluid-permeable support structure from below the bed volume and removing the coffee grounds from the interior volume of the tank body through an open bottom end of the tank body;
  wherein during the loading coffee grounds, the introducing feed water, the collecting the cold-brew coffee and the removing the coffee grounds, the tank body is supported by a tank support structure in an elevated position with a vertical clearance below the tank body to accommodate access to below the tank body to remove the fluid-permeable support structure from below the bed volume and to remove the coffee grounds from the interior volume through the open bottom end of the tank body.

49. The method of example combination 48, wherein the cold-brew coffee brewing system comprises a brew control system for controlling a said cold-brewing cycle, wherein the brew control system comprises a flow sensor unit with a flow sensor positioned to monitor water feed rate to the feed water distribution system for the dispersion of feed water during a said cold-brewing cycle, a controller unit with an electronic controller in communication with the flow sensor unit and a flow control unit having a control valve manipulable to change the water feed rate, wherein the controller unit is in communication with the flow sensor unit and the flow control unit and the method comprises:
  during the introducing feed water, monitoring the water feed rate to the water distribution system with the flow sensor unit and generating by the flow sensor unit sensor signals indicative of the monitored water feed rate;
  communicating the sensor signals to the controller unit and processing information of the sensor signals by the electronic controller to generate flow control signals from the controller unit; and
  communicating the flow control signals to the flow control unit to manipulate the control valve to change the water feed rate based on the flow control signals.

50. The method of example combination 49, wherein the brew control system comprises a user interface manipulable by a human user to specify brewing instructions executable by the electronic controller to control a said cold-brewing cycle; and the method comprises
  specifying brewing instructions through manipulation of the user interface.

51. The method of either one of example combination 49 or example combination 50, wherein the brew control system is configured to include in the brewing instructions predefined fields of user-defined input that is inputtable into the brew control system by a user through the user interface, the user-defined input including user-specified quantity of the coffee grounds loaded into the interior volume for a said cold-brewing cycle, and the method comprises during the manipulating the user interface:
  specifying a quantity of the coffee grounds loaded into the interior volume during the loading coffee grounds.

52. The method of example combination 51, wherein the brew control system is operable in an automatic mode to automatically set and control the water feed rate and duration of water feed during a said cold-brewing cycle, and the method comprises:
  operating the brew control system in the automatic mode to control the introducing feed water.

53. The method of either one of example combination 52, wherein the user-defined input includes at least one optional input field for a user to input through the user interface at least one parameter for a said cold-brewing cycle to modify at least one of the water feed rate and duration of water feed relative to the automatic mode, and the method comprises:

manipulating the user interface to specify modification of at least one of the water feed rate and duration of water feed relative to the automatic mode; and at the direction of the electronic controller manipulating the control valve to control the feed water based at least in part on the specified modifications.

54. The method of either one of example combination 52 or example combination 53, wherein the user-defined input includes at least one optional input field for a user to input through the user interface to specify at least one of target volume yield of cold-brew coffee and total brew time for a said cold-brewing cycle, and the method comprises:

manipulating the user interface to specify one or both specified parameters of a target volume yield and total brew time for a said cold-brewing cycle;

at the direction of the electronic controller manipulating the control valve to control the feed water based at least in part on the specified parameters.

55. The method of any one of example combinations 50-54, comprising commencement and termination of the introducing feed water through opening and closing of the control valve at the direction of the electronic controller.

56. The method of any one of example combinations 50-55, further comprising a data recorder in communication with the electronic controller and configured to record for the brewing cycle, at the direction of the electronic controller, at least one of total feed water input, total brew time, extraction ratio of cold-brew coffee produced per unit quantity of coffee grounds, and actual yield of cold-brew coffee produced, and the method comprises:

at the direction of the electronic controller, recording by the data recorder at least one of total feed water input, total brew time, extraction ratio of cold-brew coffee produced per unit quantity of coffee grounds, and actual yield of cold-brew coffee produced.

57. The method of any one of example combinations 48-56, comprising prior to the loading coffee grounds:

from a position in which the tank body is not supported by the tank support structure, engaging the tank body with the tank support structure to support the tank body in the elevated position by the tank support structure.

58. The method of example combination 57, comprising prior to the engaging, removing the tank body from engagement with the tank support structure and cleaning the tank body at a location remote to the tank support structure.

59. The method of either one of example combination 57 or example combination 58, the tank support structure comprises a top opening in which a portion of the tank body is received in the tank support structure by insertion from above when the tank body is engaged with the tank support structure to support the tank body in the elevated position.

60. The method of any one of example combinations 48-59, wherein the tank support structure comprises a side opening for receiving a receptacle to be removably positioned below the internal volume of the tank body by translating the receptacle through the side opening, and the method comprises:

prior to the collecting the cold-brew coffee, translating a collection receptacle through the side opening and positioning the collection receptacle to collect in the collection receptacle the cold-brew coffee exiting the brew tank assembly during the collecting the cold-brew coffee; and after the collecting the cold-brew coffee translating the collection receptacle out of the side opening and removing the collection receptacle from below the interior volume of the tank body.

61. The method of example combination 60, comprising after the removing the collection receptacle from below the interior volume of the tank body and prior to the removing the fluid-permeable support structure from below the bed volume, translating a waste receptacle through the side opening and positioning the waste receptacle below the interior volume of the tank body to receive the coffee grounds falling from the interior volume when the fluid-permeable support structure is removed from below the bed volume.

62. The method of any one of example combinations 1-61, wherein the cold-brew coffee brewing system comprises a swing arm assembly with a movable support member on which the fluid-permeable support structure is supportable from below, wherein the swing arm assembly is configured to swing to a side to laterally translate the fluid-permeable support structure from below the interior volume to a side of the tank body with the fluid-permeable support structure supported by the movable support member, to provide access into the interior volume from below without obstruction from below by the fluid-permeable support structurer, and the removing the fluid-permeable support structure from below the bed volume comprises:

with the fluid-permeable support structure supported by the swing arm assembly, laterally articulating the movable support member to laterally translate the fluid-permeable support structure from below the interior volume to a side of the tank body.

63. The method of example combination 62, wherein the swing arm assembly comprises a vertical adjustment mechanism to vertically adjust the elevation at which the fluid-permeable support structure is supported by the movable support member, to raise and lower the fluid-permeable support structure to engage and disengage the fluid-permeable support structure with the tank body, and the removing the fluid-permeable support structure from below the bed volume comprises:

prior to the laterally articulating, lowering the fluid-permeable support structure to disengage the fluid-permeable support structure from the tank body.

64. The method of either one of example combination 62 or example combination 63, wherein the swing arm assembly is supported by the tank body support structure.

65. The method of any one of example combinations 1-64, wherein:

during the collecting, the brew tank assembly comprises a collection funnel disposed to receive the cold-brew coffee exiting from the fluid-permeable support structure, the collection funnel including a fluid outlet through which the cold brew coffee exits the brew tank assembly; and the collecting comprises directing the cold-brew coffee from the fluid outlet into a collection receptacle disposed below the interior volume of the tank body.

66. The method of example combination 65, comprising prior to the removing the fluid-permeable support structure from below the bed volume, removing the collection funnel from the brew tank assembly.

67. The method of example combination 66, wherein prior to removing the collection funnel, the collection funnel is supported by the fluid-permeable support structure and the removing the collection funnel comprises disengaging the collection funnel from the fluid-permeable support structure.

68. The method of any one of example combinations 48-67, comprising after the removing the coffee grounds, disengaging and removing the tank body from the tank support structure and cleaning the tank body while not supported by the tank support structure.

69. The method of example combination 68, comprising after the cleaning the tank body while not supported by the tank support structure, re-engaging the tank body with the tank support structure to support the cleaned tank body by the tank support structure ready for performing a new said cold-brewing cycle.

70. The method of any one of example combinations 1-48, wherein the top cover comprises a fluid manifold cavity and an array of drip orifices through a bottom of the top cover in fluid communication with the fluid manifold cavity to drip the dispersion of feed water; and
   the introducing feed water into the interior volume comprises introducing water into the fluid manifold cavity to exit the manifold cavity through the drip orifices into the interior volume of the tank body above the bed of the coffee grounds.

71. The method of any one of example combinations 1-48, wherein the cold-brew coffee brewing system comprises a fluid spray head disposed in the interior volume above the coffee grounds during the introducing water, and the introducing water comprises spraying the dispersion of feed water from the spray head.

72. The method of example combination 71, wherein the spray head is supported on a vertically adjustable support that is vertically adjustable to raise and lower the elevation of the spray head in the interior volume to permit setting a vertical standoff between the spray head and a top surface of the coffee grounds in the interior volume; and
   the method comprises prior to the introducing feed water, adjusting a vertical elevation of the spray head in the interior volume.

73. The method of example combination 72, wherein the vertically adjustable support comprises a vertically translatable conduit member extending through the top cover and a locking mechanism supported by the top cover, the locking mechanism being manipulable between an unlocked configuration in which the vertically translatable conduit is translatable to change the elevation of the spray head in the interior volume and a locked configuration in which the translatable conduit is locked in place relative to the top cover with the spray head set at a fixed elevation in the interior volume; and
   the adjusting a vertical elevation comprises first manipulating the locking mechanism from the locked configuration to the unlocked configuration, translating the translatable conduit relative to the top cover from a first position to a different second position relative to the top cover and second manipulating the locking mechanism from the unlocked configuration to the locked configuration with the translatable conduit positioned at the second position.

74. The method of any one of example combinations 71-73, wherein during the introducing feed water the spray head is disposed at an elevation in a range of from 10 centimeters to 30 centimeters above the top surface of the coffee grounds in the interior volume.

75. The method of any one of example combinations 48-74, comprising during the loading coffee grounds disposing a total quantity of from 1 kilogram to 50 kilograms of the coffee grounds in the interior volume.

76. The method of any one of example combination 75, wherein the bed of the coffee grounds including the total quantity of the coffee grounds has a vertical height of from 2.5 centimeters to 50 centimeters.

77. The method of either one of example combination 75 or example combination 76, comprising during the introducing feed water, introducing into the interior volume over the bed of the coffee grounds a cumulative quantity of the feed water in a range of from 10 liters to 300 liters.

78. The method of example combination 77, wherein a ratio of the cumulative quantity of the feed water to the total quantity of the coffee grounds is in a range of from 3 to 25 liters of the feed water per kilogram of the coffee grounds.

79. The method of any one of example combinations 76-78, comprising during the collecting cold-brewed coffee, collecting a cumulative quantity of the cold-brew coffee in a range of from 10 liters to 300 liters.

80. The method of example combination 79, wherein a ratio of the cumulative quantity of the cold-brew coffee to the total quantity of the coffee grounds is in a range of from 2 to 20 liters of the cold-brew coffee per kilogram of the coffee grounds.

81. The method of any one of example combinations 48-80, wherein during the introducing the feed water is introduced into the interior volume at an average feed rate in a range of from 130 to 600 milliliters per minute.

82. The method of any one of example combinations 48-81, wherein the introducing the feed water lasts for a time in a range of from 1 to 24 hours.

83. The method of any one of example combinations 48-82, wherein a combined duration of the introducing feed water and the collecting the cold-brew coffee is in a range of from 1 to 24 hours.

84. The method of any one of example combinations 48-83, wherein during the introducing feed water, the feed water is at a temperature in a range of from 3° C. to 80° C.

85. The method of any one of example combinations 48-83, comprising:
   prior to the loading coffee grounds, removably inserting an auxiliary brewing container insert into the interior volume supported from below by the fluid-permeable support structure and with an annular space between the tank body and the auxiliary brewing container insert, the auxiliary brewing container insert having an interior containment space open at a top end and at a bottom end of the auxiliary brewing container insert; and
   during the loading coffee grounds the coffee grounds are loaded in the interior containment space of the auxiliary brewing container insert, wherein the bed of the coffee grounds is disposed in the interior containment space of the auxiliary brewing container insert and coffee grounds are not disposed in the annular space.

86. The method of example combination 85, wherein the introducing feed water into the interior volume comprises introducing the feed water into the interior containment space of the auxiliary brewing container insert and not into the annular space.

87. The method of either one of example combination 85 or example combination 86, wherein the interior containment space has a volume of no larger than a volume of the annular space.

88. A method according to any one of example combinations 48-87, wherein the cold-brew coffee brewing system is according to any one of example combinations 1-47 and 89-91.

89. The cold-brew coffee brewing system of any one of example combinations 1-47, comprising an auxiliary brewing container insert that is removably insertable into the interior volume to be disposed in the interior volume supported from below by the fluid-permeable support structure and with an annular space between the auxiliary brewing container insert and the tank body, and wherein:

the auxiliary brewing container insert has an interior containment space open at a top end and at a bottom end of the auxiliary brewing container insert, to permit the bed of the coffee grounds to be disposed in the interior containment space over the fluid-permeable support structure to brew smaller batches of the cold-brew coffee.

90. The cold-brew coffee brewing system of example combination 89, wherein the feed water distribution system is adjustable to limit providing the dispersion of feed water to inside the interior containment space when the auxiliary brewing container insert is disposed in the interior volume.

91. The cold-brew coffee brewing system of either one of example combination 89 or example combination 90, wherein the interior containment space has a volume of no larger than a volume of the annular space.

The foregoing description of the present invention and various aspects thereof has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all.

What is claimed is:

1. A cold-brew coffee brewing system, the system comprising:

a brew tank assembly, comprising:

a tank body with an interior volume including a bed volume to contain a bed of the coffee grounds during cold-brewing cycles to brew cold-brew coffee;

a top cover disposed to enclose the bed volume from above during a said cold-brewing cycle and being selectively removable to access the interior volume to load coffee grounds in the bed volume for a said cold-brewing cycle; and a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;

a feed water distribution system in fluid communication with the interior volume and configured to distribute a dispersion of feed water over a top surface area of the bed of the coffee grounds disposed in the bed volume during a said cold-brewing cycle; and a tank support structure supporting the tank body in an elevated position during a said cold-brewing cycle;

wherein:

the top cover is selectively removable to access the interior volume from above through an open top end of the tank body to load fresh said coffee grounds into the bed volume for a said cold-brewing cycle;

the fluid-permeable support structure is selectively removable from below the bed volume with the tank body supported in the elevated position by the tank support structure for removal of used said coffee grounds from the interior volume through an open bottom end of the tank body following a said cold-brewing cycle;

in the elevated position the tank body has a vertical clearance below the open bottom end of the tank body to receive a waste container below the interior volume to receive the used said coffee grounds removed from the interior volume through the open bottom end of the tank body;

the fluid-permeable support structure comprises a rigid permeable member and filter element disposed above the rigid permeable member;

the fluid permeable support structure is removably connected to an outside wall of the tank body;

the brew tank assembly comprises a collection funnel disposed to receive the cold-brew coffee exiting from the fluid-permeable support structure during a said cold-brewing cycle, the collection funnel including a fluid outlet through which the cold-brew coffee exits the brew tank assembly during a said cold-brewing cycle, the collection funnel being selectively removable from the brew tank assembly together with or separate from the fluid-permeable support structure to permit removal of the used coffee grounds from the interior volume following a said cold-brewing cycle; and the collection funnel is supported by the permeable support structure, and is selectively removable from the permeable support structure.

2. A cold-brew coffee brewing system, the system comprising:
   a brew tank assembly, comprising:
      a tank body with an interior volume including a bed volume to contain a bed of the coffee grounds during cold-brewing cycles to brew cold-brew coffee;
      a top cover disposed to enclose the bed volume from above during a said cold-brewing cycle and being selectively removable to access the interior volume to load coffee grounds in the bed volume for a said cold-brewing cycle; and
      a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
   a feed water distribution system in fluid communication with the interior volume and configured to distribute a dispersion of feed water over a top surface area of the bed of the coffee grounds disposed in the bed volume during a said cold-brewing cycle; and
   a tank support structure supporting the tank body in an elevated position during a said cold-brewing cycle;
wherein:
   the top cover is selectively removable to access the interior volume from above through an open top end of the tank body to load fresh said coffee grounds into the bed volume for a said cold-brewing cycle;
   the fluid-permeable support structure is selectively removable from below the bed volume with the tank body supported in the elevated position by the tank support structure for removal of used said coffee grounds from the interior volume through an open bottom end of the tank body following a said cold-brewing cycle;
   in the elevated position the tank body has a vertical clearance below the open bottom end of the tank body to receive a waste container below the interior volume to receive the used said coffee grounds removed from the interior volume through the open bottom end of the tank body;
   the fluid-permeable support structure comprises a rigid permeable member and filter element disposed above the rigid permeable member;
   the fluid permeable support structure is removably connected to an outside wall of the tank body;
   the brew tank assembly comprises a collection funnel disposed to receive the cold-brew coffee exiting from the fluid-permeable support structure during a said cold-brewing cycle, the collection funnel including a fluid outlet through which the cold-brew coffee exits the brew tank assembly during a said cold-brewing cycle, the collection funnel being selectively removable from the brew tank assembly together with or separate from the fluid-permeable support structure to permit removal of the used coffee grounds from the interior volume following a said cold-brewing cycle; and
the collection funnel comprises an upwardly-projecting peripheral lip portion.

3. The cold-brew coffee brewing system of claim 2, wherein for a said cold-brew brewing cycle, at least a bottom portion of the tank body is received in the lip portion of the collection funnel and at least a bottom portion of the fluid-permeable support structure disposed below the bottom portion of the tank body is received in the lip portion of the collection funnel.

4. The cold-brew coffee brewing system of claim 3, wherein the lip portion of collection funnel has a vertical height in a range of from 3 centimeter to 10 centimeters.

5. A cold-brew coffee brewing system, the system comprising:
   a brew tank assembly, comprising:
      a tank body with an interior volume including a bed volume to contain a bed of the coffee grounds during cold-brewing cycles to brew cold-brew coffee;
      a top cover disposed to enclose the bed volume from above during a said cold-brewing cycle and being selectively removable to access the interior volume to load coffee grounds in the bed volume for a said cold-brewing cycle; and
      a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
   a feed water distribution system in fluid communication with the interior volume and configured to distribute a dispersion of feed water over a top surface area of the bed of the coffee grounds disposed in the bed volume during a said cold-brewing cycle;
   a tank support structure supporting the tank body in an elevated position during a said cold-brewing cycle; and
   a swing arm assembly supported by the tank support structure, the swing arm assembly including a movable support member configured for lateral articulating movement at an elevation lower than a bottom elevation of the tank body;
wherein:
   the top cover is selectively removable to access the interior volume from above through an open top end of the tank body to load fresh said coffee grounds into the bed volume for a said cold-brewing cycle;
   the fluid-permeable support structure is selectively removable from below the bed volume with the tank body supported in the elevated position by the tank support structure for removal of used said coffee grounds from the interior volume through an open bottom end of the tank body following a said cold-brewing cycle;
   in the elevated position the tank body has a vertical clearance below the open bottom end of the tank body to receive a waste container below the interior volume to receive the used said coffee grounds removed from the interior volume through the open bottom end of the tank body; and
   the movable support member is positionable below the tank body to support at least the fluid-permeable support structure and to swing to a side to laterally translate the fluid-permeable support structure from below the interior volume to a side of the tank body with the fluid-permeable support structure supported by the movable support member, to provide access into the interior volume from below without obstruction from the fluid-permeable support structure for removal of the used coffee grounds from the bed volume through the open end of the tank body.

6. The cold-brew coffee brewing system of claim 5, wherein the swing arm assembly comprises a vertical adjustment mechanism to vertically adjust the elevation at which the fluid-permeable support structure is supported by the movable support member, to raise and lower the fluid-permeable support structure for engagement and disengagement of the fluid permeable support structure with the tank body.

7. The cold-brew coffee brewing system of claim 6, wherein the swing arm assembly is configured to provide a vertical clearance below the moveable support member to permit a waste receptacle having a height of at least 40 centimeters to be received in the tank support structure and positioned under the interior volume while the fluid-permeable support structure is translated by the swing arm assembly from below the interior volume to the side of the tank body without obstruction by the waste receptacle.

8. The cold-brew coffee brewing system of claim 6, wherein:
the tank support structure comprises a side opening for receiving a receptacle to be removably positioned below the interior volume of the tank body by translating the receptacle through the side opening; and
the side opening has a vertical clearance dimension in a range of from 40 centimeters to 120 centimeters over a horizontal clearance dimension in a range of from 40 centimeters to 120 centimeters.

9. The cold-brew coffee brewing system of claim 8, comprising a wheeled collection receptacle configured to be wheel-translatable through the side opening to be received in the tank support structure positioned to collect the cold-brew coffee exiting the brew tank assembly during a said cold-brewing cycle; and
wherein the collection receptacle has a vertical height dimension in a range of from 10 centimeters to 70 centimeters and a fluid containment volume in a range of from 5 liters to 120 liters.

10. The cold-brew coffee brewing system of claim 9, wherein the collection receptacle is received in the tank support structure positioned to collect the cold-brew coffee exiting the tank assembly during a said cold-brewing cycle.

11. The cold-brew coffee brewing system of claim 8, comprising a wheeled waste receptacle that is configured to be wheel-translatable through the side opening to be received in the tank support structure positioned to receive the used coffee grounds falling from the interior volume when the fluid-permeable support structure is moved from below the bed volume for removal of the used coffee grounds through the open end of the tank body; and
wherein the waste receptacle has a vertical height dimension in a range of from 20 centimeters to 100 centimeters.

12. A cold-brew coffee brewing system, the system comprising:
a brew tank assembly, comprising:
a tank body with an interior volume including a bed volume to contain a bed of the coffee grounds during cold-brewing cycles to brew cold-brew coffee;
a top cover disposed to enclose the bed volume from above during a said cold-brewing cycle and being selectively removable to access the interior volume to load coffee grounds in the bed volume for a said cold-brewing cycle; and
a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
a feed water distribution system in fluid communication with the interior volume and configured to distribute a dispersion of feed water over a top surface area of the bed of the coffee grounds disposed in the bed volume during a said cold-brewing cycle, and
a tank support structure supporting the tank body in an elevated position during a said cold-brewing cycle;
wherein:
the top cover is selectively removable to access the interior volume from above through an open top end of the tank body to load fresh said coffee grounds into the bed volume for a said cold-brewing cycle;
the fluid-permeable support structure is selectively removable from below the bed volume with the tank body supported in the elevated position by the tank support structure for removal of used said coffee grounds from the interior volume through an open bottom end of the tank body following a said cold-brewing cycle;
in the elevated position the tank body has a vertical clearance below the open bottom end of the tank body to receive a waste container below the interior volume to receive the used said coffee grounds removed from the interior volume through the open bottom end of the tank body;
the feed water distribution system comprises a fluid spray head disposed in the interior volume of the tank to spray the dispersion of feed water;
the spray head is supported on a vertically adjustable support that is vertically adjustable to raise and lower the elevation of the spray head in the interior volume to permit setting a vertical standoff between the spray head and a top surface of the bed of the coffee grounds in the bed volume during a said cold-brewing cycle; and
the vertically adjustable support comprises a vertically translatable conduit member extending through the top cover and a locking mechanism supported by the top cover, the locking mechanism being manipulable between an unlocked configuration in which the vertically translatable conduit is translatable to change the elevation of the spray head in the interior volume and a locked configuration in which the translatable conduit is locked in place relative to the top cover with the spray head set at a fixed elevation in the interior volume.

13. The cold-brew coffee brewing system of claim 12, wherein the locking mechanism comprises a collet assembly with a collet nut that is rotatable to manipulate the locking mechanism between the locked and unlocked configurations.

14. A cold-brew coffee brewing system, the system comprising:
a brew tank assembly, comprising:
a tank body with an interior volume including a bed volume to contain a bed of the coffee grounds during cold-brewing cycles to brew cold-brew coffee;
a top cover disposed to enclose the bed volume from above during a said cold-brewing cycle and being selectively removable to access the interior volume to load coffee grounds in the bed volume for a said cold-brewing cycle; and
a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
a feed water distribution system in fluid communication with the interior volume and configured to distribute a dispersion of feed water over a top surface area of the bed of the coffee grounds disposed in the bed volume during a said cold-brewing cycle; and
a tank support structure supporting the tank body in an elevated position during a said cold-brewing cycle;

wherein:
the top cover is selectively removable to access the interior volume from above through an open top end of the tank body to load fresh said coffee grounds into the bed volume for a said cold-brewing cycle;
the fluid-permeable support structure is selectively removable from below the bed volume with the tank body supported in the elevated position by the tank support structure for removal of used said coffee grounds from the interior volume through an open bottom end of the tank body following a said cold-brewing cycle;
in the elevated position the tank body has a vertical clearance below the open bottom end of the tank body to receive a waste container below the interior volume to receive the used said coffee grounds removed from the interior volume through the open bottom end of the tank body;
the fluid-permeable support structure comprises a rigid permeable member and filter element disposed above the rigid permeable member;
the fluid permeable support structure is removably connected to an outside wall of the tank body; and
the entire brew tank assembly is supported by the tank support structure and as supported by the tank support structure a portion of the tank body is received in the tank support structure by insertion from above into a top opening in the tank support structure to engage and be supported by the tank support structure, and wherein the tank body is removable from the tank support structure by withdrawing the inserted portion of the tank body upward through the top opening to disengage the tank body from tank support structure, and wherein after removal the tank body is re-insertable from above through the top opening to reengage and be supported by the tank support structure.

15. A cold-brew coffee brewing system, the system comprising:
a brew tank assembly, comprising:
a tank body with an interior volume including a bed volume to contain a bed of the coffee grounds during cold-brewing cycles to brew cold-brew coffee;
a top cover disposed to enclose the bed volume from above during a said cold-brewing cycle and being selectively removable to access the interior volume to load coffee grounds in the bed volume for a said cold-brewing cycle; and
a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
a feed water distribution system in fluid communication with the interior volume and configured to distribute a dispersion of feed water over a top surface area of the bed of the coffee grounds disposed in the bed volume during a said cold-brewing cycle;
a tank support structure supporting the tank body in an elevated position during a said cold-brewing cycle; and
a brew control system for controlling a said cold-brewing cycle, wherein the brew control system comprises:
a flow sensor unit with a flow sensor positioned to monitor water feed rate to the feed water distribution system for the dispersion of feed water during a said cold-brewing cycle;
a controller unit in communication with the flow sensor unit to receive and process sensor signals generated by the flow sensor unit indicative of the monitored water feed rate, the controller unit including an electronic controller to process information of the sensor signals and direct generation of flow control signals from the controller unit; and
a flow control unit including a control valve manipulable to change the water feed rate, the flow control unit in communication with the controller unit to receive the flow control signals to manipulate the control valve to change the water feed rate;

wherein:
the top cover is selectively removable to access the interior volume from above through an open top end of the tank body to load fresh said coffee grounds into the bed volume for a said cold-brewing cycle;
the fluid-permeable support structure is selectively removable from below the bed volume with the tank body supported in the elevated position by the tank support structure for removal of used said coffee grounds from the interior volume through an open bottom end of the tank body following a said cold-brewing cycle; and
in the elevated position the tank body has a vertical clearance below the open bottom end of the tank body to receive a waste container below the interior volume to receive the used said coffee grounds removed from the interior volume through the open bottom end of the tank body.

16. The cold-brew coffee brewing system of claim 15, wherein:
the brew control system comprises a user interface manipulable by a human user to specify brewing instructions executable by the electronic controller to control a said cold-brewing cycle; and
the brew control system is configured to include in the brewing instructions predefined fields of user-defined input that is inputtable into the brew control system by a user through the user interface, the user-defined input including user-specified quantity of the coffee grounds loaded into the interior volume for a said cold-brewing cycle.

17. The cold-brew coffee brewing system of claim 16, wherein:
the brew control system is operable in an automatic mode to automatically set and control the water feed rate and duration of water feed during a said cold-brewing cycle;
the user-defined input includes at least one optional input field for a user to optionally input through the user interface at least one parameter for a said cold-brewing cycle to modify at and least one of the water feed rate and duration of water feed relative to the automatic mode; and
the at least one optional input field includes at least one of target volume yield of cold-brew coffee and total brew time for a said cold-brewing cycle.

18. The cold-brew coffee brewing system of claim 17, further comprising a data recorder in communication with the electronic controller and configured to record for the brewing cycle, at the direction of the electronic controller, at least one of total feed water input, total brew time, extraction ratio of volume of cold-brew coffee produced per unit quantity of coffee grounds, and actual volume yield of cold-brew coffee produced.

19. A cold-brew coffee brewing system, the system comprising:
a brew tank assembly, comprising:
a tank body with an interior volume including a bed volume to contain a bed of the coffee grounds during cold-brewing cycles to brew cold-brew coffee;
a top cover disposed to enclose the bed volume from above during a said cold-brewing cycle and being selectively removable to access the interior volume to load coffee grounds in the bed volume for a said cold-brewing cycle, and
a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle,
a feed water distribution system in fluid communication with the interior volume and configured to distribute a dispersion of feed water over a top surface area of the bed of the coffee grounds disposed in the bed volume during a said cold-brewing cycle; and
a tank support structure supporting the tank body in an elevated position during a said cold-brewing cycle; and
an auxiliary brewing container insert that is removably insertable into the interior volume to be disposed in the interior volume supported from below by the fluid-permeable support structure and with an annular space between the auxiliary brewing container insert and the tank body;
wherein:
the top cover is selectively removable to access the interior volume from above through an open top end of the tank body to load fresh said coffee grounds into the bed volume for a said cold-brewing cycle;
the fluid-permeable support structure is selectively removable from below the bed volume with the tank body supported in the elevated position by the tank support structure for removal of used said coffee grounds from the interior volume through an open bottom end of the tank body following a said cold-brewing cycle;
in the elevated position the tank body has a vertical clearance below the open bottom end of the tank body to receive a waste container below the interior volume to receive the used said coffee grounds removed from the interior volume through the open bottom end of the tank body;
the feed water distribution system comprises a fluid spray head disposed in the interior volume of the tank to spray the dispersion of feed water;
the spray head is supported on a vertically adjustable support that is vertically adjustable to raise and lower the elevation of the spray head in the interior volume to permit setting a vertical standoff between the spray head and a top surface of the bed of the coffee grounds in the bed volume during a said cold-brewing cycle;
the auxiliary brewing container insert has an interior containment space open at a top end and at a bottom end of the auxiliary brewing container insert, to permit the bed of the coffee grounds to be disposed in the interior containment space over the fluid-permeable support structure to brew smaller batches of the cold-brew coffee; and
the feed water distribution system is adjustable to limit providing the dispersion of feed water to inside the interior containment space when the auxiliary brewing container insert is disposed in the interior volume.

20. A method of cold-brewing coffee, the method comprising:
in a cold-brew coffee brewing system comprising a tank body with an interior volume including a bed volume to contain a bed of the coffee grounds during cold-brewing cycles to brew cold-brew coffee, loading coffee grounds into the interior volume of the tank body, wherein as loaded into the interior volume during the loading, the coffee grounds are in a bed of the coffee grounds contained in the bed volume;
the cold-brew coffee brewing system comprising:
a brew tank assembly, comprising:
the tank body;
a top cover disposed to enclose the bed volume from above during a said cold-brewing cycle and being selectively removable to access the interior volume to load coffee grounds in the bed volume for a said cold-brewing cycle; and
a fluid-permeable support structure below the bed volume and on which the bed of the coffee grounds is supported in the interior volume during a said cold-brewing cycle, wherein the cold-brew coffee flows through the fluid-permeable support structure during a said cold-brewing cycle;
a feed water distribution system in fluid communication with the interior volume and configured to distribute a dispersion of feed water over a top surface area of the bed of the coffee grounds disposed in the bed volume during a said cold-brewing cycle, and
a tank support structure supporting the tank body in an elevated position during a said cold-brewing cycle;
wherein:
the top cover is selectively removable to access the interior volume from above through an open top end of the tank body to load fresh said coffee grounds into the bed volume for a said cold-brewing cycle;
the fluid-permeable support structure is selectively removable from below the bed volume with the tank body supported in the elevated position by the tank support structure for removal of used said coffee grounds from the interior volume through an open bottom end of the tank body following a said cold-brewing cycle; and
in the elevated position the tank body has a vertical clearance below the open bottom end of the tank body to receive a waste container below the interior volume to receive the used said coffee grounds removed from the interior volume through the open bottom end of the tank body;
after the loading, introducing feed water into the interior volume above the coffee grounds through the feed water distribution system in fluid communication with the interior volume and configured to distribute the dispersion of feed water over the top surface area of the bed of the coffee grounds disposed in the bed volume;
performing the introducing feed water until a total quantity of feed water has been introduced into the interior volume for a complete said cold-brewing cycle;

permitting water from the feed water to percolate through the coffee grounds;

collecting the cold-brew coffee passing through the permeable support structure and exiting the tank assembly; and after the collecting the cold-brew coffee, removing the fluid-permeable support structure from below the bed volume and removing the coffee grounds from the interior volume of the tank body through the open bottom end of the tank body;

wherein during the loading coffee grounds, the introducing feed water, the collecting the cold-brew coffee and the removing the coffee grounds, the tank body is supported by the tank support structure in an elevated position with a vertical clearance below the tank body to accommodate access to below the tank body to remove the fluid-permeable support structure from below the bed volume and to remove the coffee grounds from the interior volume through the open bottom end of the tank body.

21. The method of claim 20, wherein:

the cold-brew coffee brewing system comprises an auxiliary brewing container insert that is removably insertable into the interior volume to be disposed in the interior volume supported from below by the fluid-permeable support structure and with an annular space between the auxiliary brewing container insert and the tank body;

the auxiliary brewing container insert has an interior containment space open at a top end and at a bottom end of the auxiliary brewing container insert, to permit the bed of the coffee grounds to be disposed in the interior containment space over the fluid-permeable support structure to brew smaller batches of the cold-brew coffee;

the feed water distribution system is adjustable to limit providing the dispersion of feed water to inside the interior containment space when the auxiliary brewing container insert is disposed in the interior volume;

and during the loading, introducing feed water and the collecting the auxiliary brewing container insert is removably received in the interior volume supported from below by the fluid-permeable support structure with the annular space between the auxiliary brewing container insert and the tank body;

during the loading, the coffee grounds are loaded into the interior containment space and not in the annular space; and during the introducing feed water, the feed water is introduced into the interior containment space and not into the annular space.

* * * * *